US010944700B2

(12) United States Patent
Wang

(10) Patent No.: US 10,944,700 B2
(45) Date of Patent: Mar. 9, 2021

(54) PROCESSING LIVE COMMENTING MESSAGES BASED ON THE RATIO OF THE TOTAL NUMBER OF LIVE COMMENTING MESSAGES TO A THRESHOLD NUMBER OF LIVE COMMENTING MESSAGES DISPLAYABLE ON THE SCREEN OF A TERMINAL

(71) Applicant: BEIJING KINGSOFT INTERNET SECURITY SOFTWARE CO., LTD., Beijing (CN)

(72) Inventor: Jieming Wang, Beijing (CN)

(73) Assignee: BEIJING KINGSOFT INTERNET SECURITY SOFTWARE CO., LTD., Beijing (CN)

( * ) Notice: Subject to any disclaimer, the term of this patent is extended or adjusted under 35 U.S.C. 154(b) by 97 days.

(21) Appl. No.: 16/423,876

(22) Filed: May 28, 2019

(65) Prior Publication Data

US 2019/0394146 A1 Dec. 26, 2019

Related U.S. Application Data

(63) Continuation of application No. PCT/CN2017/099537, filed on Aug. 29, 2017.

(30) Foreign Application Priority Data

Nov. 28, 2016 (CN) .......................... 201611070315.9

(51) Int. Cl.
*H04L 12/58* (2006.01)
*H04N 21/4788* (2011.01)

(52) U.S. Cl.
CPC .......... *H04L 51/046* (2013.01); *H04L 51/043* (2013.01); *H04L 51/063* (2013.01); *H04L 51/26* (2013.01); *H04N 21/4788* (2013.01)

(58) Field of Classification Search
CPC ... H04L 51/046; H04L 51/043; H04L 51/063; H04L 51/26; H04L 51/04;
(Continued)

(56) References Cited

U.S. PATENT DOCUMENTS 5,361,396 A * 11/1994 Onoe .................... H04W 60/04
455/433
7,120,455 B1 * 10/2006 Chen ....................... H04L 51/04
455/466

(Continued)

FOREIGN PATENT DOCUMENTS

CN 106507133 A 3/2017

OTHER PUBLICATIONS

International Search Report issued in International Application No. PCT/CN2017/099537 dated Nov. 22, 2017 (2 pages).

(Continued)

*Primary Examiner* — Daniel C. Murray
(74) *Attorney, Agent, or Firm* — Osha Bergman Watanabe & Burton LLP

(57) ABSTRACT

The present disclosure provides a method and a device for processing live commenting messages, and a terminal. The method includes: obtaining a total number of a plurality of first live commenting messages sent by a plurality of first terminals in a unit time; calculating a ratio of the total number of the plurality of first live commenting messages to a first threshold; grouping the plurality of first live commenting messages based on the ratio, wherein the grouped plurality of first live commenting messages serve as second live commenting messages; grouping a plurality of second terminals based on the ratio, wherein the plurality of second terminals are configured to receive the second live com- (Continued)

menting messages; and sending the second live commenting messages in each group to a corresponding group of second terminals.

20 Claims, 11 Drawing Sheets

(58) Field of Classification Search
CPC ........... H04N 21/4788; H04N 21/4882; H04N 21/2187; H04N 21/52; H04N 21/25891; H04N 21/8126; H04N 21/234336; H04N 21/2393; H04N 21/4884; H04N 21/6377; H04N 21/6587
See application file for complete search history.

(56) References Cited

U.S. PATENT DOCUMENTS

| | | | | |
|---|---|---|---|---|
| 7,603,413 | B1* | 10/2009 | Herold | G06Q 10/10 709/204 |
| 8,549,005 | B1* | 10/2013 | Mayle | G06Q 10/101 707/737 |
| 9,467,744 | B2* | 10/2016 | Zhang | H04N 21/4756 |
| 9,514,217 | B2* | 12/2016 | Jagadish | H04L 51/046 |
| 9,787,627 | B2* | 10/2017 | Nishizawa | H04N 21/4316 |
| 9,887,900 | B2* | 2/2018 | Sturrock | H04W 28/02 |
| 10,182,024 | B1* | 1/2019 | Chung | H04L 47/00 |
| 10,284,812 | B1* | 5/2019 | Van Os | H04N 7/141 |
| 10,439,978 | B2* | 10/2019 | Liu | H04L 51/02 |
| 10,529,377 | B2* | 1/2020 | Zhang | G11B 27/105 |
| 10,666,634 | B2* | 5/2020 | Beckhardt | H04R 27/00 |
| 2002/0078441 | A1* | 6/2002 | Drake | H04N 7/17318 725/9 |
| 2002/0120504 | A1* | 8/2002 | Gould | H04N 21/4758 705/14.2 |
| 2006/0200528 | A1* | 9/2006 | Pathiyal | H04L 51/38 709/206 |
| 2010/0100904 | A1* | 4/2010 | Kawakami | H04N 21/8133 725/37 |
| 2010/0248749 | A1* | 9/2010 | Koo | H04W 60/00 455/458 |
| 2010/0262917 | A1* | 10/2010 | Hardy | H04L 51/26 715/735 |
| 2014/0047049 | A1* | 2/2014 | Poston | H04L 51/32 709/206 |
| 2014/0168354 | A1* | 6/2014 | Clavel | H04N 21/4788 348/14.09 |
| 2014/0317240 | A1* | 10/2014 | Handsaker | H04N 21/47815 709/219 |
| 2014/0359029 | A1* | 12/2014 | Jagadish | H04L 51/22 709/206 |
| 2015/0177974 | A1* | 6/2015 | Lu | H04L 51/04 715/752 |
| 2016/0050263 | A1* | 2/2016 | Hwang | H04L 67/10 709/206 |
| 2016/0050326 | A1* | 2/2016 | Lee | H04N 1/00244 358/402 |
| 2016/0073168 | A1* | 3/2016 | Gardes | H04N 21/23424 725/32 |
| 2016/0277328 | A1* | 9/2016 | Ishizuka | H04N 21/8547 |
| 2016/0286244 | A1* | 9/2016 | Chang | H04N 21/4788 |
| 2016/0306504 | A1* | 10/2016 | Brunsch | H04M 1/72552 |
| 2016/0328364 | A1* | 11/2016 | Bastide | G06F 40/151 |
| 2016/0359786 | A1* | 12/2016 | Jhaveri | H04L 67/2842 |
| 2016/0373525 | A1* | 12/2016 | Cheng | H04L 67/1044 |
| 2017/0257410 | A1* | 9/2017 | Gattis | H04N 21/8455 |
| 2017/0318350 | A1* | 11/2017 | Wielgosz | H04N 21/4755 |
| 2017/0359619 | A1* | 12/2017 | Wang | H04N 21/4788 |
| 2018/0034874 | A1* | 2/2018 | Cornell | G06Q 10/10 |
| 2018/0097766 | A1* | 4/2018 | Bhagwan | G06F 3/0481 |
| 2018/0199179 | A1* | 7/2018 | Rauner | G08B 25/10 |
| 2019/0090270 | A1* | 3/2019 | Zhang | H04W 74/004 |
| 2019/0149852 | A1* | 5/2019 | Zhong | H04N 21/23439 725/109 |
| 2019/0166394 | A1* | 5/2019 | Lin | H04N 21/4884 |
| 2019/0179852 | A1* | 6/2019 | Fei | G06K 9/00744 |
| 2020/0177529 | A1* | 6/2020 | Trim | H04L 51/32 |
| 2020/0252692 | A1* | 8/2020 | Kawakami | H04N 21/4781 |
| 2020/0327176 | A1* | 10/2020 | Zhang | G06F 16/958 |

OTHER PUBLICATIONS

Written Opinion issued in International Application No. PCT/CN2017/099537 dated Nov. 22, 2017 (5 pages).

* cited by examiner

PROCESSING LIVE COMMENTING MESSAGES BASED ON THE RATIO OF THE TOTAL NUMBER OF LIVE COMMENTING MESSAGES TO A THRESHOLD NUMBER OF LIVE COMMENTING MESSAGES DISPLAYABLE ON THE SCREEN OF A TERMINAL

CROSS-REFERENCE TO RELATED APPLICATIONS

This application is a continuation application of International Application No. PCT/CN2017/099537, filed on Aug. 29, 2017, which claims priority to and benefits of Chinese Patent Application Serial No. 201611070315.9, entitled as "METHOD, DEVICE AND SYSTEM FOR PROCESSING OVERLAY COMMENT MESSAGE AND APPARATUS THEREOF", and filed on Nov. 28, 2016 by BEIJING KINGSOFT INTERNET SECURITY SOFTWARE CO., LTD.

FIELD

The present disclosure relates to the field of Internet technologies, and more particularly, to a method for processing live commenting messages, a device for processing live commenting messages, a system for processing live commenting messages, and a device.

BACKGROUND

With the development of Internet technology, the Internet has become a major area for user activities, and the user can conduct online communication, shopping and other activities on the Internet. With the increasing utilization of the Internet, the functional services provided by the Internet for users are becoming more and more diversified.

Generally, in order to increase the interactivity between Internet users, in the live broadcasting, video broadcasting and other scenarios, the live commenting function is provided for the user, such that live commenting messages can be displayed on the relevant interface of the user's terminal in a floating form, to display the user comment or other information.

However, when there are too many user comments, the live commenting messages may be updated too fast due to the large flow, and the user cannot see the content of live commenting messages, the interactivity between the users is limited.

In the related art, in order to avoid the above problems, all the users are divided into different groups, and only the live commenting messages sent by the users in the group are provided to the user, resulting in that the displayed live commenting messages are monotonous, and the provided live commenting messages are limited.

SUMMARY

Embodiments of the present disclosure provide a method for processing live commenting messages. The method includes: obtaining a total number of a plurality of first live commenting messages sent by a plurality of first terminals in a unit time; calculating a ratio of the total number of the plurality of first live commenting messages to a first threshold; grouping the plurality of first live commenting messages based on the ratio, in which the grouped plurality of first live commenting messages serve as second live commenting messages; grouping a plurality of second terminals based on the ratio; and sending the second live commenting messages in each group to a corresponding group of second terminals. The second terminal display the corresponding group of second live commenting messages.

Embodiments of the present disclosure provide a method for processing live commenting messages. The method includes: receiving a first live commenting message sent by a user; sending the first live commenting message to a server, in which the server is configured to count a total number of a plurality of first live commenting messages received in a unit time, calculate a ratio of the total number of the plurality of first live commenting messages to a first threshold, group the plurality of first live commenting messages and terminals based on the ratio, and send each group of first live commenting messages to a corresponding group of terminals, the terminals are configured to receive live commenting messages; receiving second live commenting messages sent by the server, the second live commenting messages are messages in a group corresponding to the grouped terminal; and displaying received second live commenting messages.

Embodiments of the present disclosure provide a terminal. The terminal includes a processor, a memory, a communication interface, and a bus. The processor, the memory and the communication interface are connected to each other and communicate with each other through the bus. The memory is configured to store executable program codes. The processor is configured to run a program corresponding to the executable program codes by reading the executable program codes stored in the memory, to execute a method for processing live commenting messages. The method includes: receiving a first live commenting message sent by a user; sending the first live commenting message to a server, in which the server is configured to count a total number of a plurality of first live commenting messages received in a unit time, calculate a ratio of the total number of the plurality of first live commenting messages to a first threshold, group the plurality of first live commenting messages and terminals based on the ratio, and send each group of first live commenting messages to a corresponding group of terminals, the terminals are configured to receive live commenting messages; receiving second live commenting messages sent by the server, the second live commenting messages are messages in a group corresponding to the grouped terminal; and displaying received second live commenting messages.

Embodiments of the present disclosure provide a non-transitory computer readable storage medium. When instructions in the storage medium are executed by a processor of a mobile terminal, causing the mobile terminal to perform a method for processing live commenting messages. The method includes: obtaining a total number of a plurality of first live commenting messages sent by a plurality of first terminals in a unit time; calculating a ratio of the total number of the plurality of first live commenting messages to a first threshold; grouping the plurality of first live commenting messages based on the ratio, in which the grouped plurality of first live commenting messages serve as second live commenting messages; grouping a plurality of second terminals based on the ratio, in which the plurality of second terminals are configured to receive the second live commenting messages; and sending the second live commenting messages in each group to a corresponding group of second terminals.

Embodiments of the present disclosure provide a non-transitory computer readable storage medium. When instructions in the storage medium are executed by a processor of a mobile terminal, causing the mobile terminal to perform a method for processing live commenting messages. The method includes: receiving a first live commenting message sent by a user; sending the first live commenting message to a server, in which the server is configured to count a total number of a plurality of first live commenting messages received in a unit time, calculate a ratio of the total number of the plurality of first live commenting messages to a first threshold, group the plurality of first live commenting messages and terminals based on the ratio, and send each group of first live commenting messages to a corresponding group of terminals, in which the terminals are configured to receive live commenting messages; receiving second live commenting messages sent by the server, in which the second live commenting messages are messages in a group corresponding to the grouped terminal; and displaying received second live commenting messages.

Embodiments of the present disclosure provide a computer program product. When the instructions in the computer program product are executed by a processor, causing the processor to perform a method for processing live commenting messages. The method includes: obtaining a total number of a plurality of first live commenting messages sent by a plurality of first terminals in a unit time; calculating a ratio of the total number of the plurality of first live commenting messages to a first threshold; grouping the plurality of first live commenting messages based on the ratio, in which the grouped plurality of first live commenting messages serve as second live commenting messages; grouping a plurality of second terminals based on the ratio, in which the plurality of second terminals are configured to receive the second live commenting messages; and sending the second live commenting messages in each group to a corresponding group of second terminals.

Embodiments of the present disclosure provide a computer program product. When the instructions in the computer program product are executed by a processor, causing the processor to perform a method for processing live commenting messages. The method includes: receiving a first live commenting message sent by a user; sending the first live commenting message to a server, in which the server is configured to count a total number of a plurality of first live commenting messages received in a unit time, calculate a ratio of the total number of the plurality of first live commenting messages to a first threshold, group the plurality of first live commenting messages and terminals based on the ratio, and send each group of first live commenting messages to a corresponding group of terminals, in which the terminals are configured to receive live commenting messages; receiving second live commenting messages sent by the server, in which the second live commenting messages are messages in a group corresponding to the grouped terminal; and displaying received second live commenting messages.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
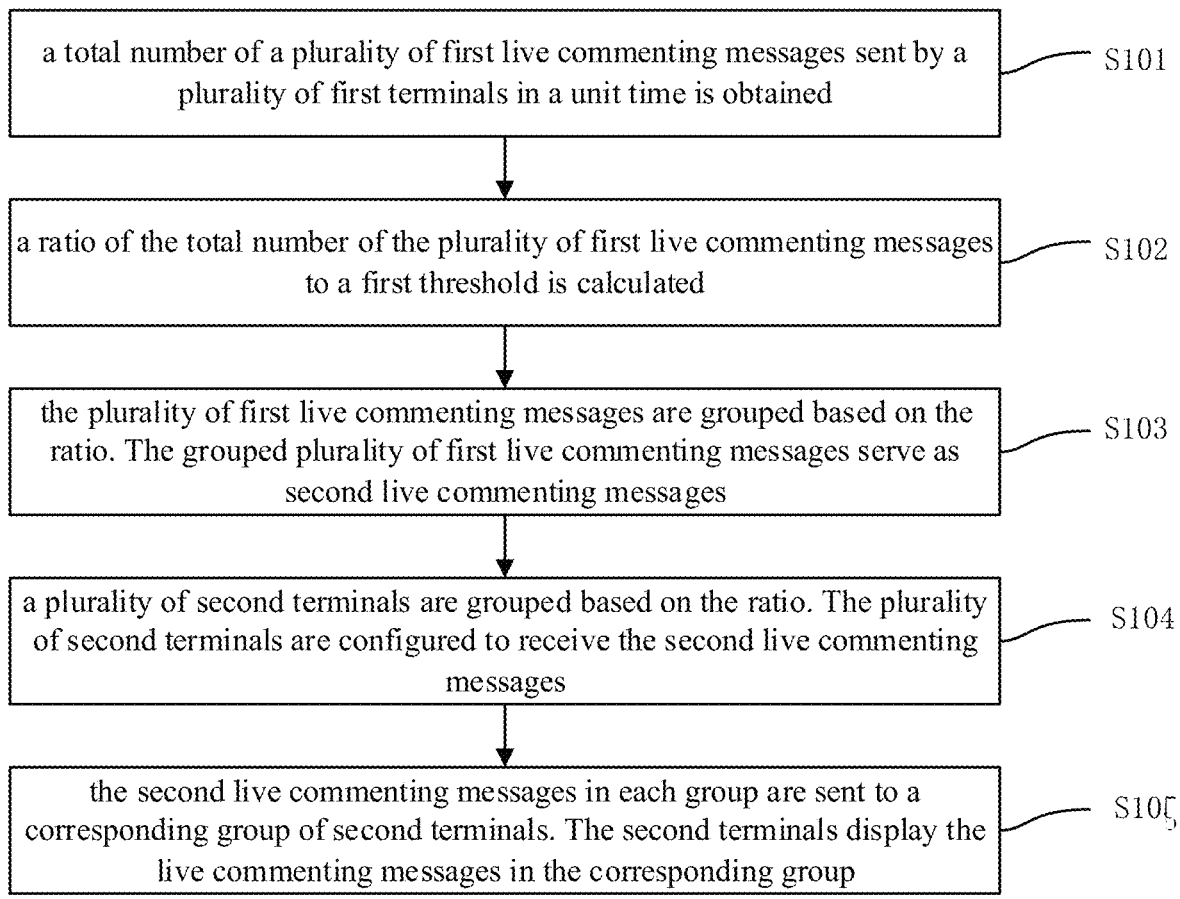
FIG. 1 is a flow chart of a method for processing live commenting messages according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

A method, a device and a system for processing live commenting messages, and a device according to embodiments of the present disclosure will be described below with reference to the accompanying drawings.

At present, as a function of sending comments while watching videos, live commenting is increasingly sought after by users. The user can send the live commenting messages for the video watched, such that other users can view the comments on the video. Meanwhile, the user can also view the live commenting messages sent by other users on the current playing interface, so as to know other users' comments on the video in real time, and even, different users may chat with each other by sending the live commenting messages.

However, when there are more live commenting messages for the video played currently, the live commenting messages may be updated too fast, and it may be difficult for the user to see the content of the live commenting messages. For example, for the live broadcast video of a well-known anchor, when the viewer sends many live commenting messages, the live interface may be refreshed too fast, the user cannot see the specific content of the live commenting messages, and the anchor cannot obtain the viewer's comments on the video based on the live commenting messages, such that the interactivity between the user is limited.

By the manner of grouping the users and providing the user with the live commenting messages sent by the users in the same group, since the grouping of the user is fixed, the user can only see the live commenting messages sent by the users in the same group, and cannot see the live commenting messages sent by the users in other groups, the obtained live commenting messages are limited, and the user experience is poor.

In order to avoid the above problems, the present disclosure provides a method for processing live commenting messages, the users are randomly grouped, and all current live commenting messages are randomly grouped, such that the corresponding group of live commenting messages is provided to the user based on the grouping of the users, since the live commenting messages are evenly grouped based on big data, the live commenting messages displayed by the terminal can be enriched.

It should be noted that, the terminal may be a hardware device with various operating systems and display components, such as a mobile phone, a tablet computer, a personal digital assistant, a wearable device. The wearable device may be a smart wristband, a smart watch, a smart glass, or the like.

For the convenience of explanation, the following will be described on the server side.

FIG. 1 is a flow chart of a method for processing live commenting messages according to an embodiment of the present disclosure.

As illustrated in FIG. 1, the method may include followings.

At block S101, a total number of a plurality of first live commenting messages sent by a plurality of first terminals in a unit time is obtained.

It can be understood that, when the current number of live commenting messages is less than or equal to an upper limit number of live commenting messages displayable on the terminal, all the live commenting messages can be displayed to the user. When the current number of live commenting messages is greater than the upper limit number of live commenting messages displayable on the terminal, in order to avoid updating too fast, the live commenting messages need to be processed accordingly.

Therefore, it may necessary to obtain the total number of the plurality of first live commenting messages sent by the plurality of first terminals in the unit time. The first terminal is the terminal that sends the first live commenting messages.

In addition, the duration of the unit time may be related to the frequency at which the server receives the live commenting messages, for example, when the server receives the live commenting messages every 1 second, the duration of the unit time may be any value less than or equal to 1 second.

At block 102, a ratio of the total number of the plurality of first live commenting messages to a first threshold is calculated.

At block 103, the plurality of first live commenting messages are grouped based on the ratio. The grouped plurality of first live commenting messages serve as second live commenting messages.

At block 104, a plurality of second terminals are grouped based on the ratio. The plurality of second terminals are configured to receive the second live commenting messages.

Specifically, the ratio of the total number of the plurality of first live commenting messages to the first threshold is calculated. The first threshold is the total number of live commenting messages displayable on the single screen of the second terminal, and the size of the first threshold may be related to the font size displayed by the live commenting message, the size of the display screen of the terminal, and the like.

For example, when the total number of the plurality of first live commenting messages is 100, and the first threshold is 20, it can be calculated that the ratio of the total number of the plurality of first live commenting messages to the first threshold is 5:1.

The second terminal corresponds to the terminal that receives the live commenting message. The second terminal may be included in the first terminal that sends the live commenting message, or the second terminal may only be the terminal that displays the live commenting message.

It should be understood that, when the ratio of the total number of the plurality of first live commenting messages to the first threshold is greater than 1, it indicates that the total number of the plurality of first live commenting messages is greater than the upper limit number of the live commenting messages displayable on the second terminal. When the ratio of the total number of the plurality of first live commenting messages to the first threshold is less than or equal to 1, it indicates that the total number of the plurality of first live commenting messages is less than or equal to the upper limit number of the live commenting messages displayable on the second terminal.

For example, the total number of the plurality of first live commenting messages is 150, the first threshold is 50, it can be calculated that the ratio of the total number of the plurality of first live commenting messages to the first threshold is 3:1, and the total number of the plurality of first live commenting messages is greater than the upper limit number of the live commenting messages displayable on the second terminal.

Furthermore, after the ratio of the total number of the plurality of first live commenting messages to the first threshold is calculated, the plurality of first live commenting messages and the second terminals may be randomly grouped based on the ratio, and the grouped plurality of first live commenting messages serve as the second live commenting messages. Thus, random grouping is performed in the unit of the single second terminal, and random grouping is performed in the unit of the single live commenting message, i.e., the second terminals and the plurality of first live commenting messages are separately grouped.

It should be noted that, the ratio of the total number of the plurality of first live commenting messages to the first threshold may be taken as a parameter for grouping the second terminals and the plurality of first live commenting messages. According to different application scenarios, the second terminals and the plurality of first live commenting messages may be grouped in different operation manners according to the ratio, examples are illustrated in the followings.

In a first example, a modulo of the relevant parameter of each of the second terminal and the plurality of first live commenting messages to the ratio may be obtained for grouping. The parameter of each of the second terminal and the plurality of first live commenting messages may be represented by numbers, such that different second terminals and different first live commenting messages can be distinguished.

For example, the parameter corresponding to each of the second terminal and the plurality of first live commenting messages may be identification information. For example, the identification information of the second terminal may include ID of the second terminal, and the identification information of each of the plurality of first live commenting messages may include ID of the live commenting message.

In another example, the corresponding identification number may be set in advance for geographic location, for example, the identification number corresponding to the area A may be 25, and the identification number corresponding to the area B may be 36. The corresponding identification number may be set for the time period of sending the first live commenting messages, for example, the identification number corresponding to 7:10 to 7:11 may be 33, and the identification number corresponding to 7:45 to 7:46 may be 34.

Furthermore, the geographic location of the second terminal can be identified, and the identification number corresponding to the geographic location of the second terminal can be obtained based on the geographic location of the second terminal. Similarly, the sending time of the first live commenting message can be identified, and the identification number corresponding to the first live commenting message can be determined based on the sending time of the first live commenting message.

In the following, it is illustrated by taking the parameter corresponding to each of the second terminal and the plurality of first live commenting messages as the identification information, i.e., the identification information of each of the plurality of first live commenting messages can be obtained, and the modulo of the identification information of each of the plurality of first live commenting messages to the ratio can be obtained to obtain a modulo corresponding to each of the plurality of first live commenting messages.

Then, based on the modulo corresponding to each of the plurality of first live commenting messages, the first live commenting messages having the same modulo may be divided into a same group, and the grouped plurality of first live commenting messages serve as the second live commenting messages.

For example, it is obtained that the ID of a first live commenting message x is 66, when the ratio of the total number of the plurality of first live commenting messages to the first threshold is 5, it can be obtained that the modulo corresponding to the first live commenting message x is 1, when it is obtained that the ID of a first live commenting message y is 19, it can be obtained that the modulo corresponding to the first live commenting message y is 4, when it is obtained that the ID of a first live commenting message z is 16, it can be obtained that the modulo corresponding to the first live commenting message z is 1, thus the first live commenting message x and the first live commenting message z may be divided into the same group, and the first live commenting message y may be divided into a group.

Similarly, in the example, the identification information of the second terminal can be obtained, a modulo of the identification information of each of the plurality of second terminals to the ratio can be obtained to obtain a modulo corresponding to each of the plurality of second terminals, and the second terminals having the same modulo may be divided into the same group based on the modulo corresponding to each of the plurality of second terminals.

For example, it is obtained that the ID of a second terminal A is 66, when the ratio of the total number of the plurality of second terminals to the first threshold is 5, it can be obtained that the modulo corresponding to the second terminal A is 1, when it is obtained that the ID of a second terminal B is 19, it can be obtained that the modulo corresponding to the second terminal B is 4, when it is obtained that the ID of a second terminal C is 16, it can be obtained that the modulo corresponding to the second terminal C is 1, thus the second terminal A and the second terminal C may be divided into the same group, and the second terminal B may be divided into a group.

In a second example, the multiplied value of the relevant parameter of each of the second terminal and the plurality of first live commenting messages and the ratio may be obtained for grouping. The parameter of each of the second terminal and the plurality of first live commenting messages may be represented by numbers, such that different second terminals and different first live commenting messages can be distinguished. For example, the ID corresponding to each of the second terminal and the first live commenting message may be used to identify.

In the example, the ID of the second terminal may be multiplied by the ratio, and the second terminals having the same tail number of the multiplied value may be divided into the same group.

When the ID of the second terminal A is 66, the ratio of the total number of the plurality of second terminals to the first threshold is 5, it can be obtained that the tail number of the multiplied value corresponding to the second terminal A is 0, when the ID of the second terminal B is 19, it can be obtained that the tail number of the multiplied value corresponding to the second terminal B is 5, when the ID of the second terminal C is 16, it can be obtained that the tail number of the multiplied value corresponding to the second terminal C is 0, thus the second terminal A and the second terminal C may be divided into the same group, and the second terminal B may be divided into a group.

Similarly, the ID of the first live commenting message can be multiplied by the ratio, and the first live commenting messages having the same tail number of the multiplied value may be divided into the same group.

For example, the ID of the first live commenting message x is 66, when the ratio of the total number of the plurality of first live commenting messages to the first threshold is 5, it can be obtained that the tail number of the multiplied value corresponding to the first live commenting message x is 0, when the ID of the first live commenting message y is 19, it can be obtained that the tail number of the multiplied value corresponding to the first live commenting message y is 5, when the ID of the first live commenting message z is 16, it can be obtained that the tail number of the multiplied value corresponding to the first live commenting message z is 0, thus the first live commenting message x and the first live commenting message z may be divided into the same group, and the first live commenting message y may be divided into a group.

It should be noted that, when the second terminals and the plurality of first live commenting messages are grouped, the parameter taken for grouping the plurality of first live commenting messages based on the ratio may be different from or the same as the parameter taken for grouping the second terminals based on the ratio, which is not limited herein.

At block 105, the second live commenting messages in each group are sent to a corresponding group of second terminals. The second terminal displays the corresponding group of live commenting messages.

Specifically, after the second terminals and the plurality of first live commenting messages are randomly grouped, a plurality of groups of second live commenting messages can be obtained, the second live commenting messages in each group can be sent to the corresponding group of second terminals, such that the first live commenting messages are grouped according to the single live commenting message, the first live commenting messages can be evenly distributed, the second terminals can receive more abundant live commenting messages.

For example, in the live application scenario, the second group may include live commenting messages from a chat room A, and include live commenting messages from other chat rooms such as a chat room B and a chat room C, such that the second terminal in the second group can basically receive the live commenting messages of every chat room, and the comments of each type of users on the current live video can be known.

In order to clearly explain the method for processing live commenting messages according to embodiments of the present disclosure, the following may take the live broadcast scenario as an example to illustrate the processing process of the live commenting messages in the actual application.

In an embodiment of the present disclosure, when the number of the live commenting messages sent in the live broadcast room is greater than the preset number of live commenting messages displayable on a single screen of the terminal (i.e., the first threshold), the messages may be sent in groups.

The server may control the first live commenting messages and the second terminals according to the ratio of the total number of the first live commenting messages to the first threshold. It is assumed that the total number of the first live commenting messages received in a unit time in the current live broadcast room is 1000, and the first threshold of the number of messages displayable on the single screen of the terminal is 50, it can be calculated that the ratio is 20:1.

Further, the modulo operation can be performed based on the ID of the second terminal and the ratio 20. It is assumed that the ID of the second terminal A1 is 25, the ID of the second terminal B1 is 45, the ID of the second terminal C1 is 77, by the modulo operation 25%20=5, the second terminal A1 may be divided into the $5^{th}$ group, the second terminal B1 may be divided into the $5^{th}$ group, and the second terminal C1 may be divided into the $17^{th}$ group.

In this case, the ID of the first live commenting message x1 is 65, the ID of the first live commenting message y1 is 97, and then by the modulo operation 65%20=5, the first live commenting message x1 may be divided into the $5^{th}$ group and may be received by the second terminals (the second terminal A1, the second terminal B1) in the $5^{th}$ group, by the modulo operation 97%20=17, the live commenting message y1 may be divided into the $17^{th}$ group and may be received by the second terminals (the second terminal C1) in the $17^{th}$ group.

In another embodiment of the present disclosure, it is assumed that the total number of the first live commenting messages is 100, the first threshold of the number of messages displayable on the single screen of the terminal is 50, it can be calculated that the ratio of the total number of the plurality of first live commenting messages to the first threshold is 2:1. For the second terminal A2 having the ID of 25, by the modulo operation 25%2=1, it may be divided into the $1^{th}$ group. For the second terminal B2 having the ID of 15 and the second terminal C2 having the ID of 35, by the modulo operation, they may be divided into the $1^{th}$ group.

In the embodiment, for the first live commenting message x2 having the ID of 65, by the modulo operation 65%2=1, it may be divided into the $1^{th}$ group. For the live commenting message y2 having the ID of 97, by the modulo operation 97%2=1, it may also be divided into the $1^{th}$ group. Thus, the second terminals A2, B2, C2 can receive the live commenting messages x2 and y2.

In summary, with the method for processing live commenting messages according to embodiments of the present disclosure, the total number of the plurality of first live commenting messages sent by the plurality of first terminals in the unit time is obtained, the ratio of the total number of the plurality of first live commenting messages to the first threshold is calculated, and the plurality of first live commenting messages are grouped based on the ratio, the grouped plurality of first live commenting messages serve as the second live commenting messages, and the second terminals are grouped based on the ratio, and then the second live commenting messages in each group are sent to the corresponding group of second terminals. Thus, the live commenting messages displayed by the terminal can be enriched, and the interactivity between users can be improved.

Based on the above embodiments, it should be understood that, in practical applications, in order to increase user's sense of participation, the users should receive the live commenting message they send.

Figure 2:
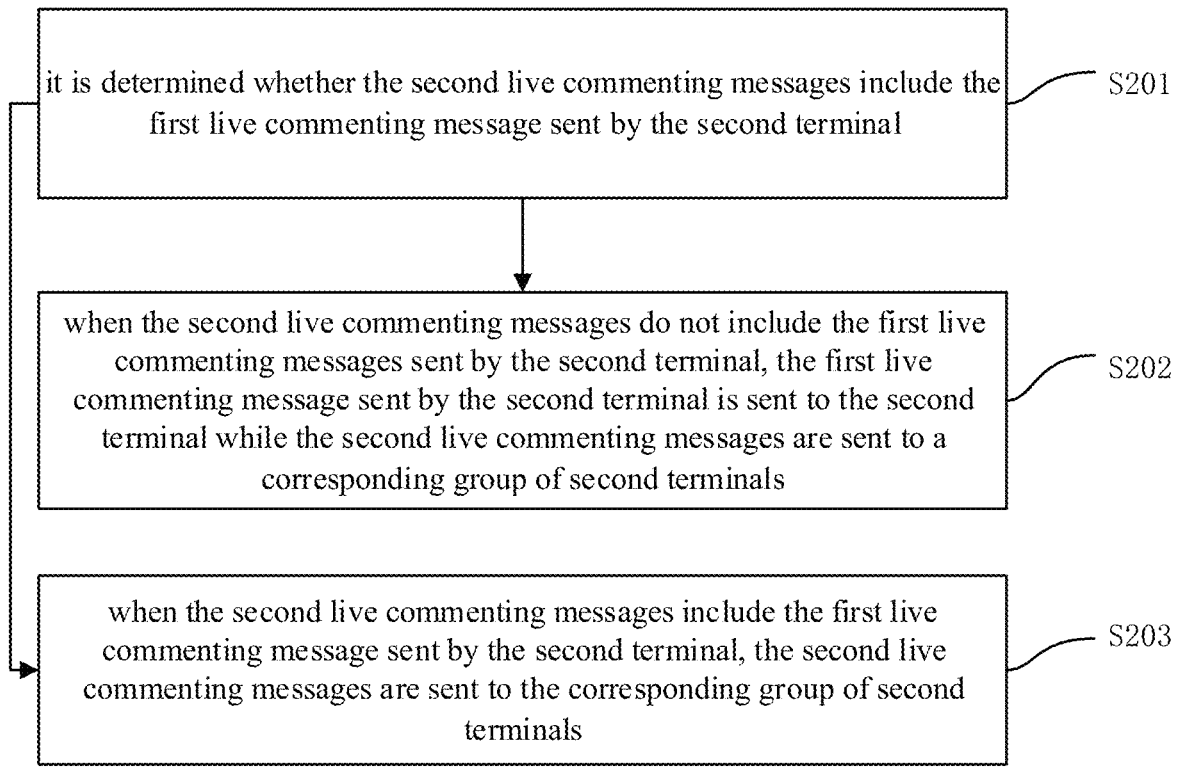
FIG. 2 is a flow chart of a method for processing live commenting messages according to an embodiment of the present disclosure.

Specifically, FIG. 2 is a flow chart of a method for processing live commenting messages according to an embodiment of the present disclosure. As illustrated in FIG. 2, while the above block S105 is implemented, the method may further include followings.

At block S201, it is determined whether the second live commenting messages include the first live commenting message sent by the second terminal.

At block S202, when the second live commenting messages do not include the first live commenting messages sent by the second terminal, the first live commenting message sent by the second terminal is sent to the second terminal while the second live commenting messages are sent to a corresponding group of second terminals.

At block S203, when the second live commenting messages include the first live commenting message sent by the second terminal, the second live commenting messages are sent to the corresponding group of second terminals.

Specifically, while the second live commenting messages are sent to the corresponding group of second terminals, the first live commenting message sent by the second terminal needs to be sent to the second terminal, so as to enhance the user's sense of participation.

Specifically, it is determined whether the second live commenting messages include the first live commenting message sent by the second terminal, such that when the second live commenting messages do not include the first live commenting messages sent by the second terminal, the first live commenting message sent by the second terminal may be sent to the second terminal while the second live commenting messages are sent to the corresponding group of second terminals.

When the second live commenting messages do not include the first live commenting messages sent by the second terminal, the first live commenting message sent by the second terminal may be obtained in various manners. For example, the identifier of the second terminal may be matched with the identifier of the first live commenting message, so as to obtain the matched first live commenting message sent by the second terminal. For example, the first live commenting message sent by the second terminal may be directly obtained from the first live commenting messages locally stored by the second terminal.

In addition, in the embodiment, when the second live commenting messages include the first live commenting message sent by the second terminal, the second live commenting messages may be directly sent to the corresponding group of second terminals.

For example, it is assumed that the total number of the first live commenting messages is 100, the first threshold of the number of messages displayable on the single screen of the terminal is 50, it can be calculated that the ratio of the total number of the plurality of first live commenting messages to the first threshold is 2:1. For the second terminal A2 having the ID of 25, by the modulo operation 25%2=1, it may be divided into the $1^{th}$ group. For the second terminal B2 having the ID of 14, by the modulo operation, it may be divided into the $0^{th}$ group.

In the embodiment, for the first live commenting message x2 sent by the second terminal A2, its ID is 65, by the modulo operation 65%2=1, it may be divided into the $1^{th}$ group. For the live commenting message y2 sent by the second terminal B2, its ID is 97, by the modulo operation 97%2=1, it may also be divided into the $1^{th}$ group. For the first live commenting messages z2 sent by other second terminals, its ID is 97 and by modulo operation 97%2=1, it may be divided into the $0^{th}$ group.

Thus, the second live commenting messages received by the second terminal A2 in the $1^{th}$ group includes the first live commenting messages x2 and y2, since the second live commenting messages includes the first live commenting message x2 sent by the second terminal A2, the second live commenting messages in the $1^{th}$ group may be directly sent to the second terminal A2.

The second live commenting messages received by the second terminal B2 in the $0^{th}$ group includes the first live commenting messages z2, since the second live commenting messages do not include the first live commenting message y2 sent by the second terminal B2, the first live commenting message y2 may also be sent to the second terminal B2 while the second live commenting messages in the $0^{th}$ group are sent to the second terminal B2.

It should be understood that, depending on specific application requirements, the manner of determining whether the second live commenting messages include the first live commenting message sent by the second terminal may be different, and examples are as follows.

In a first example, a plurality of identifiers of a plurality of terminals to which the second live commenting messages belong may be obtained, and the identifier of the second terminal may be matched with each of the plurality of identifiers. When the matching is successful, it indicates that the second live commenting messages include the live commenting message sent by the second terminal, thus the grouped second live commenting messages may be directly sent to the corresponding group of second terminals.

In the example, when the identifier of the second terminal fails to match any one of the plurality of identifiers, it indicates that the second live commenting messages do not include the live commenting message sent by the second terminal, thus the live commenting message sent by the second terminal may be sent to the second terminal while the second live commenting messages are sent to the corresponding group of second terminals.

In a second example, the first live commenting messages stored by the second terminal may be matched with the second live commenting messages, for example, the matching of the IP address, the keyword, the font, the sending time may be performed. When the matching is successful, it indicates that the second live commenting messages include the first live commenting message sent by the second terminal, thus the second live commenting messages may be directly sent to the corresponding group of second terminals.

In the example, when the matching fails, it indicates that the second live commenting messages do not include the first live commenting message sent by the second terminal, thus the first live commenting message sent by the second terminal may be sent to the second terminal while the second live commenting messages are sent to the corresponding group of second terminals.

In summary, with the method for processing live commenting messages according to embodiments of the present disclosure, the first live commenting message sent by the second terminal may be sent to the second terminal while the second live commenting messages are sent to the corresponding group of second terminals, such that user's sense of participation can be enhanced, and user experience can be improved.

Figure 3:
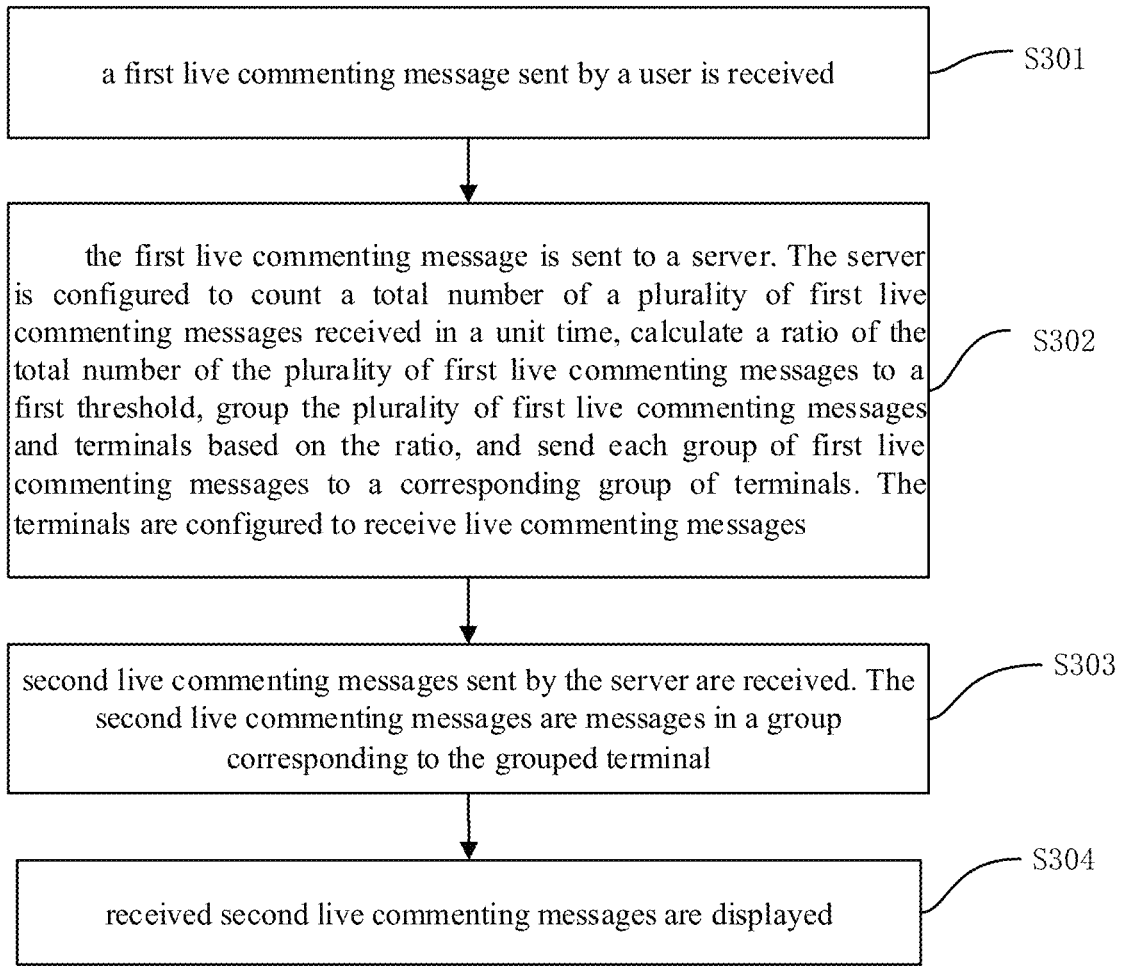
FIG. 3 is a flow chart of a method for processing live commenting messages according to another embodiment of the present disclosure.

In the following, the method for processing live commenting messages according to embodiments of the present disclosure will be described on the terminal side. FIG. 3 is a flow chart of a method for processing live commenting messages according to another embodiment of the present disclosure. As shown in FIG. 3, the method may include followings.

At block S301, a first live commenting message sent by a user is received.

Specifically, in some application scenarios, in order to improve the user's sense of participation, the first live commenting message sent by the user may be received, the comments of other users can be learned.

At block S302, the first live commenting message is sent to a server. The server is configured to count a total number of a plurality of first live commenting messages received in a unit time, calculate a ratio of the total number of the plurality of first live commenting messages to a first threshold, group the plurality of first live commenting messages and terminals based on the ratio, and send each group of first live commenting messages to a corresponding group of terminals. The terminals are configured to receive live commenting messages.

Specifically, after the first live commenting message sent by the user is received, the first live commenting message is sent to the server, such that the server can count the total number of the plurality of first live commenting messages received in the unit time, and calculate the ratio of the total number of the plurality of first live commenting messages to the first threshold.

Further, based on the ratio, the plurality of first live commenting messages and terminals can be grouped, and each group of first live commenting messages can be sent to the corresponding group of terminals. The terminals are configured to receive live commenting messages.

It should be noted that, for the process of grouping the live commenting messages and the terminals, reference may be made to the description of the method for processing live commenting messages described in FIG. 1, and details are not described herein again.

At bock S303, second live commenting messages sent by the server are received. The second live commenting messages are messages in a group corresponding to the grouped terminal.

At bock S304, received second live commenting messages are displayed.

Specifically, the second live commenting messages sent by the server are received, the second live commenting messages are messages in the group corresponding to the grouped terminal, and the received second live commenting messages are displayed. Since the live commenting messages are grouped based on big data, the live commenting messages are relatively evenly grouped, such that the user can see rich live commenting messages on the terminal, the interactivity between the users can be improved.

In summary, with the method for processing live commenting messages according to embodiments of the present disclosure, the first live commenting message sent by the user is received, the first live commenting message is sent to the server, the server counts the total number of the plurality of first live commenting messages received in the unit time, calculates the ratio of the total number of the plurality of first live commenting messages to the first threshold, groups the plurality of first live commenting messages and the terminals based on the ratio, and sends each group of first live commenting messages to the corresponding group of terminals, the terminals are configured to receive live commenting messages, the second live commenting messages sent by the server are received, and the received second live commenting messages are displayed. Thus, the live commenting messages displayed by the terminal can be enriched, and the interactivity between users can be improved.

Based on the above embodiments, it should be understood that, in actual applications, in a scenario where the anchor of the live video is a famous anchor, the live commenting messages may increase, and the number of live commenting messages in the group corresponding to the terminal may increase sharply, the upper limit number of messages displayable on the terminal may be exceeded, the messages may be updated too fast.

Therefore, in the specific implementation, corresponding processing may be performed according to the number of live commenting messages received, details are as follows.

Figure 4:
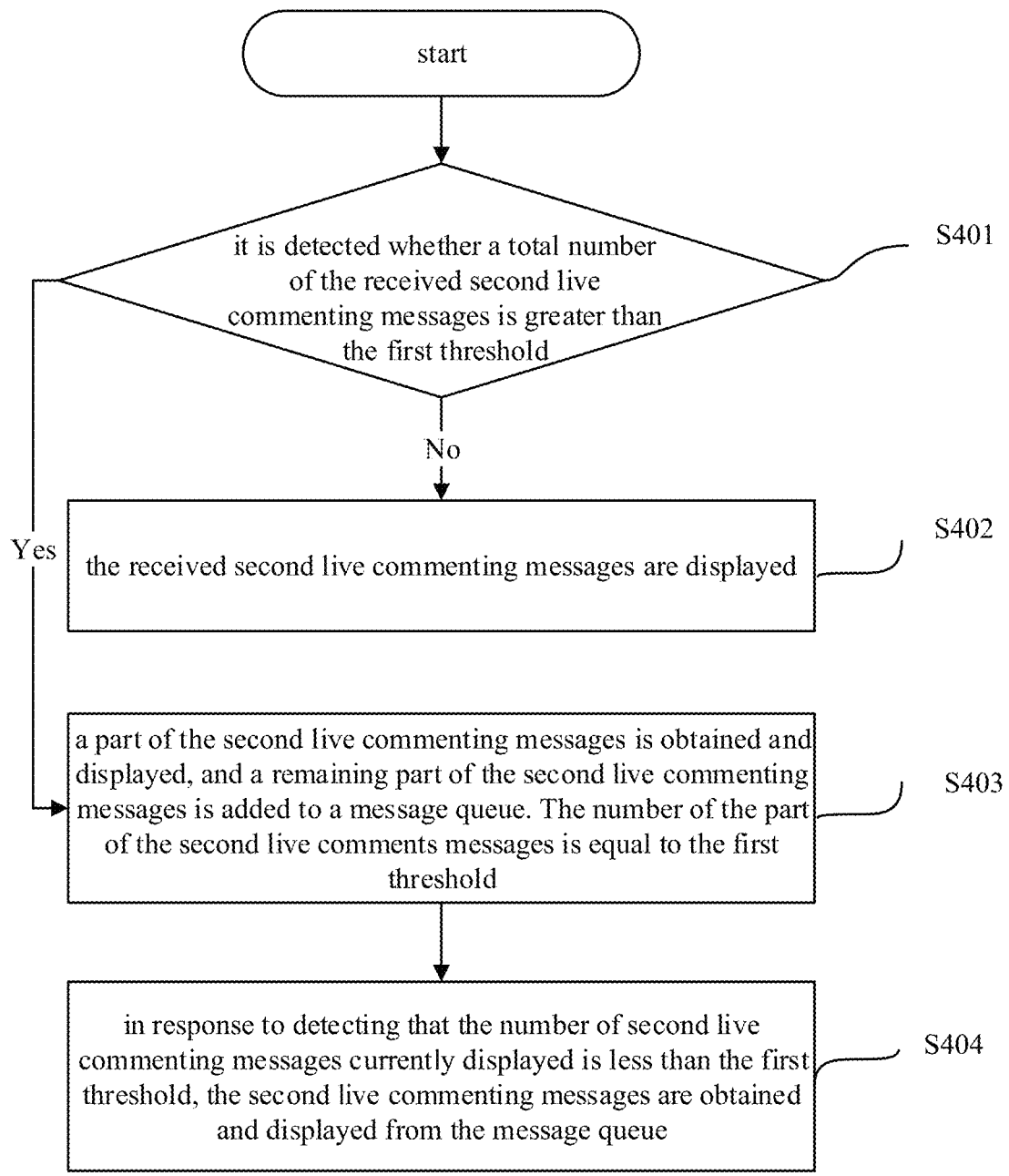
FIG. 4 is a flow chart of a method for processing live commenting messages according to yet another embodiment of the present disclosure.

FIG. 4 is a flow chart of a method for processing live commenting messages according to yet another embodiment of the present disclosure. As shown in FIG. 4, the foregoing block S303 may include the followings.

At block S401, it is detected whether a total number of the received second live commenting messages is greater than the first threshold.

Specifically, the first threshold is the total number of live commenting messages displayable on the single screen of the second terminal, and the size of the first threshold may be related to the font size displayed by the live commenting message, the size of the display screen of the terminal, and the like.

At block S402, the received second live commenting messages are displayed in response to detecting that the total number of the received second live commenting messages is less than or equal to the first threshold.

Specifically, when the total number of the received second live commenting messages is less than the first threshold, it indicates that the terminal can display all the live commenting messages, thus the received second live commenting messages are displayed.

At block S403, in response to detecting that the total number of the received second live commenting messages is greater than the first threshold, a part of the second live commenting messages is obtained and displayed, and a remaining part of the second live commenting messages is added to a message queue. The number of the part of the second live comments messages is equal to the first threshold.

Specifically, when the total number of the received second live commenting messages is greater than the first threshold, in order to avoid that the live commenting messages are updated too fast, a part of the second live commenting messages may be obtained from the received second live commenting messages for display, the number of the part of the second live comments messages is equal to the first threshold, and the remaining part of the second live commenting messages may be added to the message queue. The message queue stores the second live commenting messages to be displayed by the terminal.

For example, it is assumed that the first threshold of the live commenting messages displayable on the terminal A3 is 50 per screen. When the number of the live commenting messages in the message queue is less than 50, the received second live commenting messages are displayed.

When the number of the second live commenting messages in the message queue is greater than 50, 50 live commenting messages are obtained from the second live commenting messages for display, and the remaining second live commenting messages are added to the message queue.

It should be understood that, in practical applications, the number of second live commenting messages that can be saved in the message queue is limited, when the upper limit of the number of second live commenting messages saved in the message queue is a second threshold, in which, the second threshold is N (N is a natural number greater than or equal to 2) times the first threshold, that is, corresponding to the total number of the second live commenting messages displayable on the two screens or multiple screens of the terminal, and then when it is detected that the number of second live comment messages in the message queue is greater than the second threshold, in order to avoid memory overflow, the newly received second live comment messages will not be added to the message queue, when the number of the second live commenting messages in the message queue is less than the second threshold, the newly received second live commenting messages can continue to be added to the message queue.

At block S404, in response to detecting that the number of second live commenting messages currently displayed is less than the first threshold, the second live commenting messages are obtained and displayed from the message queue.

Specifically, when it is detected that the number of second live commenting messages currently displayed is less than the first threshold, in order to make full use of the display screen of the terminal and facilitate the user to view more second live commenting messages at one time, the second live commenting messages can be obtained and displayed from the message queue.

For example, when it is detected that the number of second live commenting messages currently displayed is 30, the first threshold is 50, and there are 30 second live commenting messages saved in the message queue, in order to make full use of the display screen of the terminal, 20 second live commenting messages can be obtained and displayed from the message queue.

Based on the above description, it should be understood that, in practical applications, in order to enhance the display effect of the live commenting messages, the number of live commenting messages displayed may be adjusted by controlling the font size displayed by the live commenting message, the speed for displaying the live commenting message, and the like. The following takes the control of the speed for displaying the live commenting messages as an example for illustration.

In an example, based on the number of second live commenting messages in the message queue, and comprehensively considering the full display of the live commenting messages and the user's clear knowledge of the content of the live commenting messages, the speed for displaying the live commenting messages may be adjusted, and the second live commenting messages to be displayed currently may be displayed based on the adjusted speed.

It should be noted that, in the embodiment of the present disclosure, the adjustment range of the display speed of the live commenting message may be small, such as 0.9×-1.1×, such that the number of live commenting messages displayed can be stable, avoiding that the live commenting messages are updated too fast, or passed too slow.

Specifically, when there are more second live commenting messages in the message queue, in order to completely display the second live commenting messages in the message queue to the user, the speed for displaying the live commenting messages may be appropriately increased, and the second live commenting messages to be displayed currently can be displayed based on the adjusted speed.

When there are fewer second live commenting messages in the message queue, in order to enable the user to clearly see the content of the second live commenting messages, the speed for displaying the live commenting messages may be appropriately decreased, and the second live commenting messages to be displayed currently can be displayed based on the adjusted speed.

In the embodiment, it is assumed that the first threshold of the second live commenting messages displayable on the terminal A is 50 per screen, in this case, in the message queue for the terminal A, the second threshold of the number of second live commenting messages for two screens of the terminal A is 100, when the number of the live commenting messages in the message queue is less than 50, in order to clearly display the second live commenting messages to the user, the display speed of the live commenting messages may be decreased, such as decreasing the display speed from 1.0× to 0.9×.

When the number of the live commenting messages is greater than the second threshold 100, the subsequent second live commenting messages are not be added to the message queue. In this case, in order to completely display the second live commenting messages to the user, the display speed of the live commenting messages may be increased from 1.0× to 1.1×.

In summary, with the method for processing live commenting messages according to embodiments of the present disclosure, it is detected whether the total number of the received live commenting messages is greater than the first threshold, when the total number of the received second live commenting messages is less than or equal to the first threshold, the received second live commenting messages are displayed, when the total number of the received second live commenting messages is greater than the first threshold, a part of the second live commenting messages are obtained and displayed from the received second live commenting messages, the number of the part of the second live commenting messages is equal to the first threshold, and the remaining part of the second live commenting messages are added to the message queue, when it is detected that the number of second live commenting messages currently displayed is less than the first threshold, the second live commenting messages are obtained and displayed from the message queue. Thus, the second live commenting messages are processed accordingly based on the number of the received second live commenting messages, the practicability and flexibility of the method for processing live commenting messages according to the present disclosure can be improved.

Based on the above embodiments, it should be understood that, in order to increase user's sense of participation, the live commenting messages sent the user should be displayed to the user.

Figure 5:
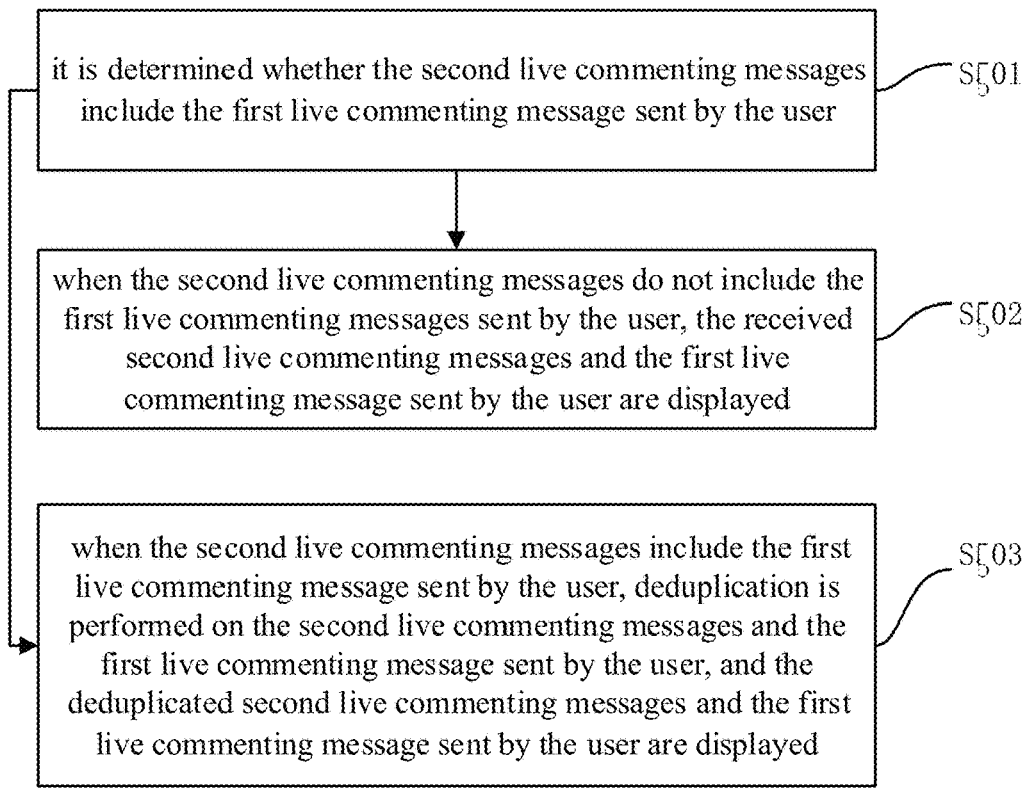
FIG. 5 is a flow chart of a method for processing live commenting messages according to still another embodiment of the present disclosure.

Specifically, FIG. 5 is a flow chart of a method for processing live commenting messages according to still another embodiment of the present disclosure. As illustrated in FIG. 5, while the above block S304 is implemented, the method may further include followings.

At block S501, it is determined whether the second live commenting messages include the first live commenting message sent by the user.

At block S502, when the second live commenting messages do not include the first live commenting messages sent by the user, the received second live commenting messages and the first live commenting message sent by the user are displayed.

At block S503, when the second live commenting messages include the first live commenting message sent by the user, deduplication is performed on the second live commenting messages and the first live commenting message sent by the user, and the deduplicated second live commenting messages and the first live commenting message sent by the user are displayed.

Specifically, while the second live commenting messages are displayed, the first live commenting message sent by the user are also displayed to the user.

Specifically, it is determined whether the second live commenting messages include the first live commenting message sent by the user, when the second live commenting messages include the first live commenting messages sent by the user, deduplication is performed on the second live commenting messages and the first live commenting message sent by the user, i.e., the first live commenting message in the second commenting messages is filtered, and the deduplicated second live commenting messages and the first live commenting message sent by the user are displayed.

In the embodiment, when the second live commenting messages do not include the first live commenting messages sent by the user, the received second live commenting messages and the first live commenting message sent by the user are directly displayed.

It should be noted that, the method for processing live commenting messages with reference to FIG. 2 may also be applicable to the method for processing live commenting messages in the embodiment of the present disclosure. For the details not described in the embodiment of the method for processing the live commenting messages of the present disclosure, they will not be repeated here.

In summary, with the method for processing live commenting messages according to embodiments of the present disclosure, while the received second live commenting messages are displayed, the first live commenting message sent by the user are also displayed. Thereby, the user's sense of participation can be improved, and the user experience can be improved.

Figure 6:
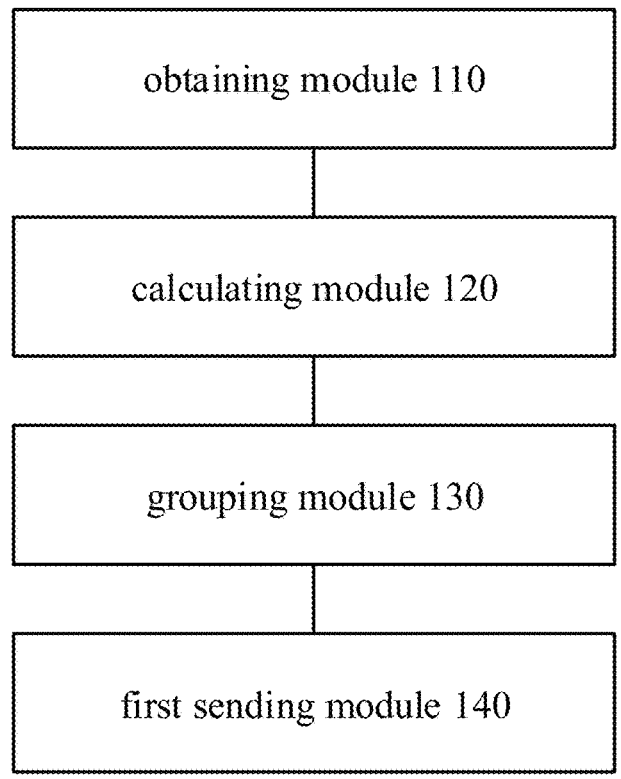
FIG. 6 is a block diagram of a device for processing live commenting messages according to a first embodiment of the present disclosure.

In order to implement the above embodiments, the present disclosure further provides a device for processing live commenting messages. FIG. 6 is a block diagram of a device for processing live commenting messages according to a first embodiment of the present disclosure, as shown in FIG. 6, the device includes an obtaining module 110, a calculating module 120, a grouping module 130, and a first sending module 140.

The obtaining module 110 is configured to obtain a total number of a plurality of first live commenting messages sent by a plurality of first terminals in a unit time.

The calculating module 120 is configured to calculate a ratio of the total number of the plurality of first live commenting messages to a first threshold.

The grouping module 130 is configured to group the plurality of first live commenting messages based on the ratio, and group a plurality of second terminals based on the ratio. The grouped plurality of first live commenting messages serve as second live commenting messages, the plurality of second terminals are configured to receive the second live commenting messages.

Figure 7:
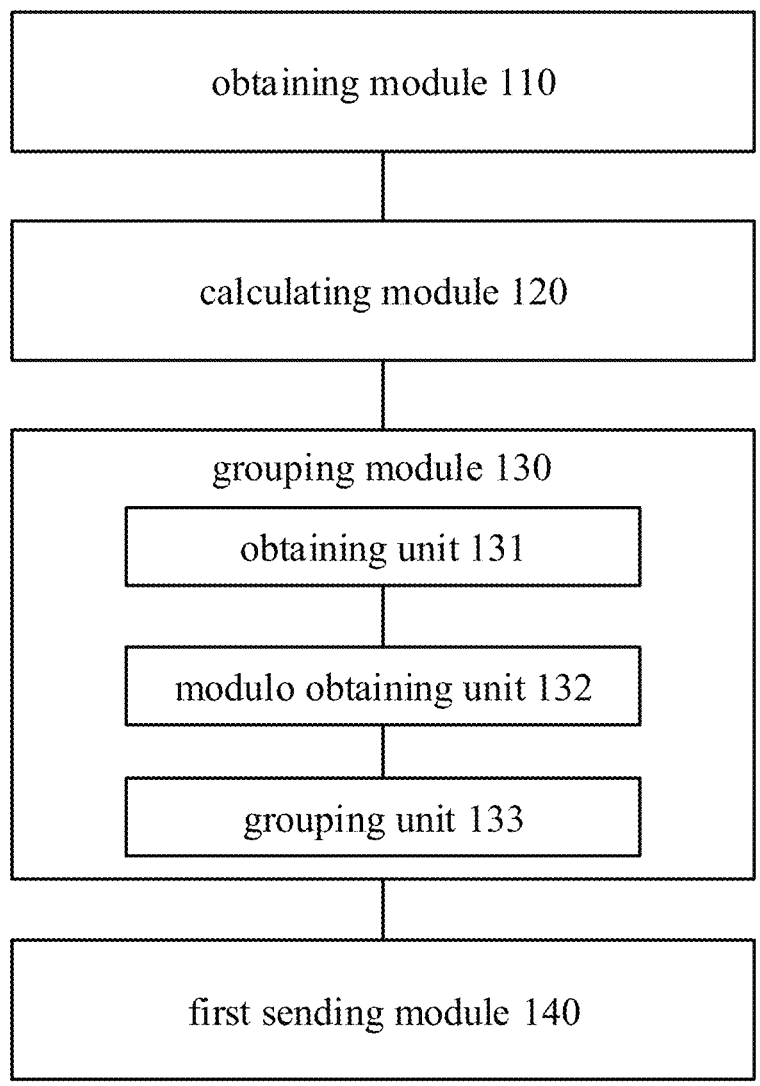
FIG. 7 is a block diagram of a device for processing live commenting messages according to a second embodiment of the present disclosure.

In an embodiment of the present disclosure, FIG. 7 is a block diagram of a device for processing live commenting messages according to a second embodiment of the present disclosure, as shown in FIG. 7, the grouping module includes an obtaining unit 131, a modulo obtaining unit 132, and a grouping unit 133.

The obtaining unit 131 is configured to obtain identification information of each of the plurality of first live commenting messages.

The modulo obtaining unit 132 is configured to obtain a modulo of the identification information of each of the plurality of first live commenting messages to the ratio, to obtain a modulo corresponding to each of the plurality of first live commenting messages.

The grouping unit 133 is configured to divide the first live commenting messages having a same modulo into a same group based on the modulo corresponding to each of the plurality of first live commenting messages.

The first threshold is a total number of live commenting messages displayable on a single screen of the second terminal.

In an embodiment of the present disclosure, the obtaining unit 131 is further configured to obtain identification information of each of the plurality of second terminals.

The modulo obtaining unit 132 is further configured to obtain a modulo of the identification information of each of the plurality of second terminals to the ratio, to obtain a modulo corresponding to each of the plurality of second terminals.

The grouping unit 133 is further configured to divide the second terminals having a same modulo into a same group based on the modulo corresponding to each of the plurality of second terminals.

The first sending module 140 is configured to send the second live commenting messages in each group to a corresponding group of second terminals. The second terminal displays the corresponding group of live commenting messages.

It should be noted that, the method for processing live commenting messages with reference to FIG. 1 may also be applicable to the device for processing live commenting messages in the embodiment of the present disclosure. For the details not described in the embodiment of the device for processing the live commenting messages of the present disclosure, they will not be repeated here.

In summary, with the device for processing live commenting messages according to embodiments of the present disclosure, the total number of the plurality of first live commenting messages sent by the plurality of first terminals in the unit time is obtained, the ratio of the total number of the plurality of first live commenting messages to the first threshold is calculated, and the plurality of first live commenting messages are grouped based on the ratio, the grouped plurality of first live commenting messages serve as the second live commenting messages, and the second terminals are grouped based on the ratio, and then the second live commenting messages in each group are sent to the corresponding group of second terminals. Thus, the live commenting messages displayed by the terminal can be enriched, and the interactivity between users can be improved.

In an embodiment of the present disclosure, the first sending module 140 is further configured to send the first live commenting message sent by the second terminal to the second terminal while sending the second live commenting messages to the corresponding group of second terminals.

In a specific implementation process, it can be determined whether the second live commenting messages include the first live commenting message sent by the second terminal Furthermore, the first sending module 140 is configured to, when the second live commenting messages do not include the first live commenting messages sent by the second terminal, send the first live commenting message sent by the second terminal to the second terminal while sending the second live commenting messages to the corresponding group of second terminals.

In the embodiment, the first sending module 140 is configured to, when the second live commenting messages include the first live commenting messages sent by the second terminal, directly send the second live commenting messages to the corresponding group of second terminals.

It should be noted that, the method for processing live commenting messages with reference to FIG. 2 may also be applicable to the device for processing live commenting messages in the embodiment of the present disclosure. For the details not described in the embodiment of the device for processing the live commenting messages of the present disclosure, they will not be repeated here.

In summary, with the device for processing live commenting messages according to embodiments of the present disclosure, while the second live commenting messages are sent to the corresponding group of second terminals, the first live commenting message sent by the second terminal is also sent to the second terminal, such that the user's sense of participation can be improved, and the user experience can be improved.

Figure 8:
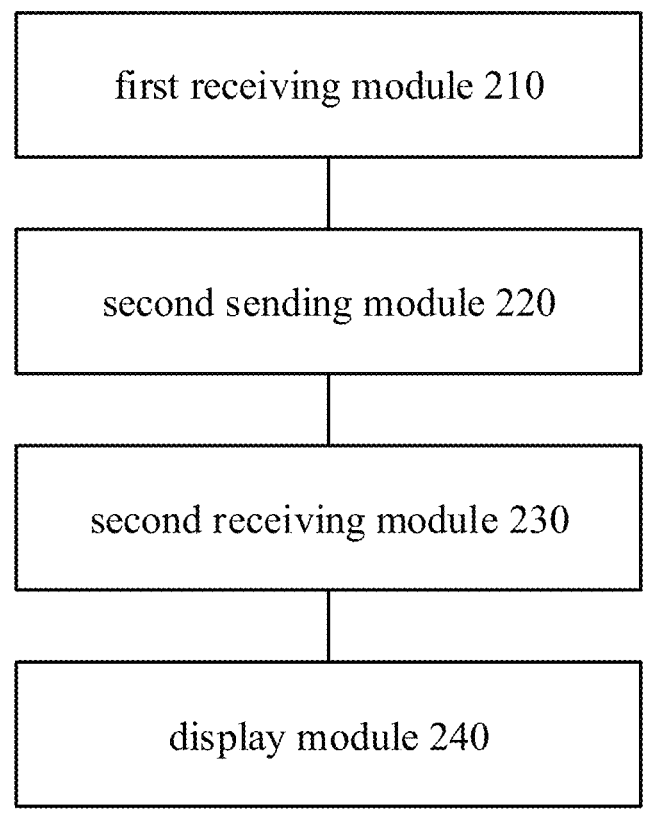
FIG. 8 is a block diagram of a device for processing live commenting messages according to a third embodiment of the present disclosure.

In order to implement the above embodiments, the present disclosure further provides a device for processing live commenting messages. FIG. 8 is a block diagram of a device for processing live commenting messages according to a third embodiment of the present disclosure, as shown in FIG. 8, the device includes a first receiving module 210, a second sending module 220, a second receiving module 230, and a display module 240.

The first receiving module 210 is configured to receive a first live commenting message sent by a user.

The second sending module 220 is configured to send the first live commenting message to a server. The server is configured to count a total number of a plurality of first live commenting messages received in a unit time, calculate a ratio of the total number of the plurality of first live commenting messages to a first threshold, group the plurality of first live commenting messages and terminals based on the ratio, and send each group of first live commenting messages to a corresponding group of terminals. The terminals are configured to receive live commenting messages.

The first threshold is a total number of live commenting messages displayable on a single screen of the terminal.

The second receiving module 230 is configured to receive second live commenting messages sent by the server.

The display module 240 is configured to display the received second live commenting messages.

It should be noted that, the method for processing live commenting messages with reference to FIG. 3 may also be applicable to the device for processing live commenting messages in the embodiment of the present disclosure. For the details not described in the embodiment of the device for processing the live commenting messages of the present disclosure, they will not be repeated here.

In summary, with the device for processing live commenting messages according to embodiments of the present disclosure, the first live commenting message sent by the user is received, the first live commenting message is sent to the server, the server is configured to count the total number of the plurality of first live commenting messages received in the unit time, calculate the ratio of the total number of the plurality of first live commenting messages to the first threshold, group the plurality of first live commenting messages and terminals based on the ratio, and send each group of first live commenting messages to the corresponding group of terminals, the terminals are configured to receive the live commenting messages, the second live commenting messages sent by the server are received, the second live commenting messages are messages in the group corresponding to the grouped terminal, and the received second live commenting messages are displayed. Thus, the live commenting messages displayed by the terminal can be enriched, and the interactivity between users can be improved.

Figure 9:
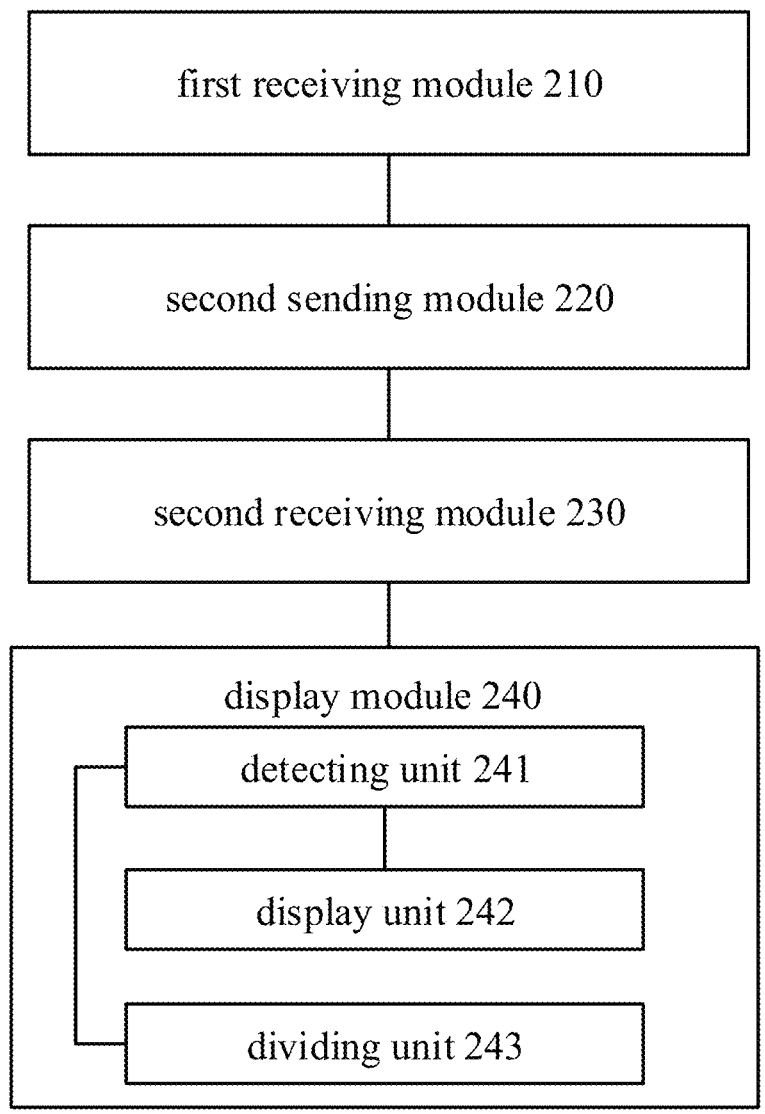
FIG. 9 is a block diagram of a device for processing live commenting messages according to a fourth embodiment of the present disclosure.

FIG. 9 is a block diagram of a device for processing live commenting messages according to a fourth embodiment of the present disclosure, as shown in FIG. 9, and on the basis of FIG. 8, the display module 240 includes a detecting unit 241, a display unit 242, and a dividing unit 243.

The detecting unit 241 is configured to detect whether a total number of the received second live commenting messages is greater than the first threshold.

The display unit 242 is configured to display the received second live commenting messages in response to detecting that the total number of the received second live commenting messages is less than or equal to the first threshold.

The dividing unit 243 is configured to, in response to detecting that the total number of the received second live commenting messages is greater than the first threshold, obtain and display a part of the second live commenting messages, and adding a remaining part of the second live commenting messages to a message queue. The number of the part of the second live comments messages is equal to the first threshold.

The display unit 242 is further configured to, in response to detecting that the number of second live commenting messages currently displayed is less than the first threshold, obtain and display the second live comment messages from the message queue.

In an embodiment of the present disclosure, when the number of messages acceptable in the message queue is a second threshold, the dividing unit 243 is further configured to not add newly received second live comment messages to the message queue when the number of second live comment messages in the message queue is greater than or equal to the second threshold, and continue adding the newly received second live comment messages to the message queue when the number of the second live comment messages in the message queue is less than the second threshold.

The second threshold is N (N is a natural number greater than or equal to 2) times the first threshold, the second threshold is the total number of the live commenting messages displayable on two screens of the terminal.

Figure 10:
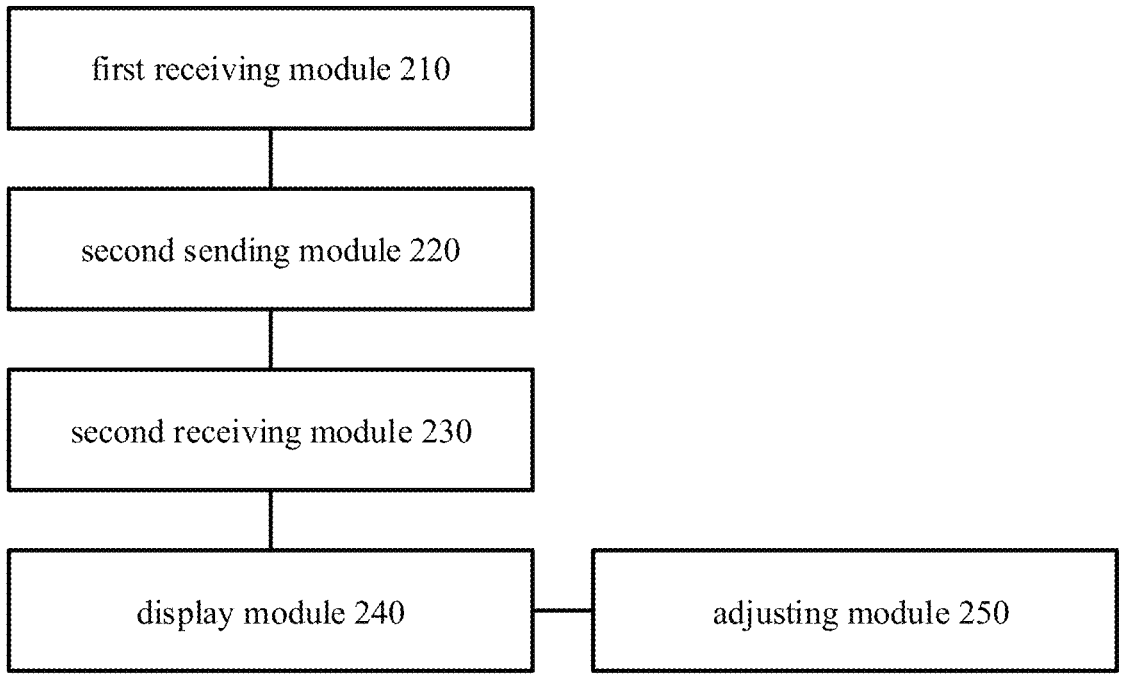
FIG. 10 is a block diagram of a device for processing live commenting messages according to a fifth embodiment of the present disclosure.

FIG. 10 is a block diagram of a device for processing live commenting messages according to a fifth embodiment of the present disclosure, as shown in FIG. 10, and on the basis of FIG. 8, the device for processing live commenting messages further includes an adjusting module 250.

The adjusting module 250 is configured to adjust a speed for displaying live comment messages based on the number of second live comment messages in the message queue.

In an embodiment of the present disclosure, the display unit 240 is configured to display the second live comment messages to be displayed currently based on the adjusted speed.

It should be noted that, the method for processing live commenting messages may also be applicable to the device for processing live commenting messages in the embodiment of the present disclosure. For the details not described in the embodiment of the device for processing the live commenting messages of the present disclosure, they will not be repeated here.

In summary, with the device for processing live commenting messages according to embodiments of the present disclosure, it is detected whether the total number of the received live commenting messages is greater than the first threshold, when the total number of the received second live commenting messages is less than or equal to the first threshold, the received second live commenting messages are displayed, when the total number of the received second live commenting messages is greater than the first threshold, a part of the second live commenting messages are obtained and displayed from the received second live commenting messages, the number of the part of the second live comments messages is equal to the first threshold, and the remaining part of the second live commenting messages are added to the message queue, when it is detected that the number of second live commenting messages currently displayed is less than the first threshold, the second live commenting messages are obtained and displayed from the message queue. Thus, the second live commenting messages are processed accordingly based on the number of the received second live commenting messages, the practicability and flexibility of the method for processing live commenting messages according to the present disclosure can be improved.

In an embodiment of the present disclosure, the display module 240 is configured to display the first live commenting message sent by the user while displaying the received second live commenting messages.

In a specific implementation process, it is determined whether the second live commenting messages include the first live commenting message sent by the user.

Further, the display module 240 is configured to, when the second live commenting messages do not include the first live commenting messages sent by the user, display the received second live commenting messages and the first live commenting message sent by the user.

In the embodiment, the display module 240 is configured to, when the second live commenting messages include the first live commenting message sent by the user, perform deduplication on the second live commenting messages and the first live commenting message sent by the user, and display the deduplicated second live commenting messages and the first live commenting message sent by the user.

It should be noted that, the method for processing live commenting messages may also be applicable to the device for processing live commenting messages in the embodiment of the present disclosure. For the details not described in the embodiment of the device for processing the live commenting messages of the present disclosure, they will not be repeated here.

In summary, with the device for processing live commenting messages according to embodiments of the present disclosure, while the received second live commenting messages are displayed, the first live commenting message sent by the user are also displayed. Thereby, the user's sense of participation can be improved, and the user experience can be improved.

Figure 11:
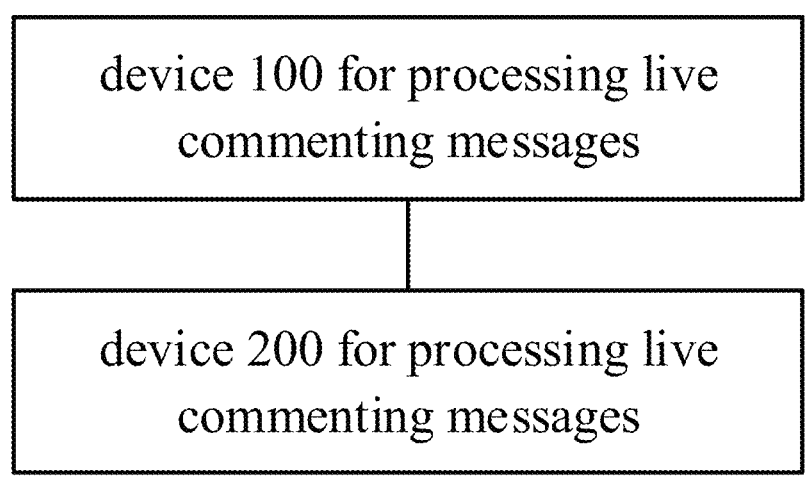
FIG. 11 is a block diagram of a system for processing live commenting messages according to an embodiment of the present disclosure.

In order to implement the above embodiments, the present disclosure further provides a system for processing live commenting messages. FIG. 11 is a block diagram of a system for processing live commenting messages according to an embodiment of the present disclosure, as shown in FIG. 11, the system includes the device 100 for processing live commenting messages and device 200 for processing live commenting messages.

The device 100 may be a serve or located in a server, and is configured to obtain a total number of a plurality of first live commenting messages sent by a plurality of first terminals in a unit time, calculate a ratio of the total number of the plurality of first live commenting messages to a first threshold, group the plurality of first live commenting messages based on the ratio, the grouped plurality of first live commenting messages serve as second live commenting messages, group a plurality of second terminals based on the ratio, the plurality of second terminals are configured to receive the second live commenting messages, and send the second live commenting messages in each group to a corresponding group of second terminals. The second terminal displays the corresponding group of live commenting messages.

The device 200 may include the terminals sending the live commenting messages and the terminals receiving the live commenting messages, and is configured to receive a first live commenting message sent by a user; send the first live commenting message to a server, in which, the server is configured to count a total number of a plurality of first live commenting messages received in a unit time, calculate a ratio of the total number of the plurality of first live commenting messages to a first threshold, group the plurality of first live commenting messages and terminals based on the ratio, and send each group of first live commenting messages to a corresponding group of terminals, the terminals are configured to receive the live commenting messages; receive second live commenting messages sent by the server, the second live commenting messages are messages in a group corresponding to the grouped terminal; and display received second live commenting messages.

It should be noted that, the device 100 for processing live commenting messages in the embodiment of the present disclosure may include the device for processing live commenting messages with reference to FIG. 6 to FIG. 7. The device 200 for processing live commenting messages in the embodiment of the present disclosure is corresponding to the device for processing live commenting messages with reference to FIG. 8 to FIG. 10, the implementation principle thereof is similar, and details are not described herein again.

Figure 12:
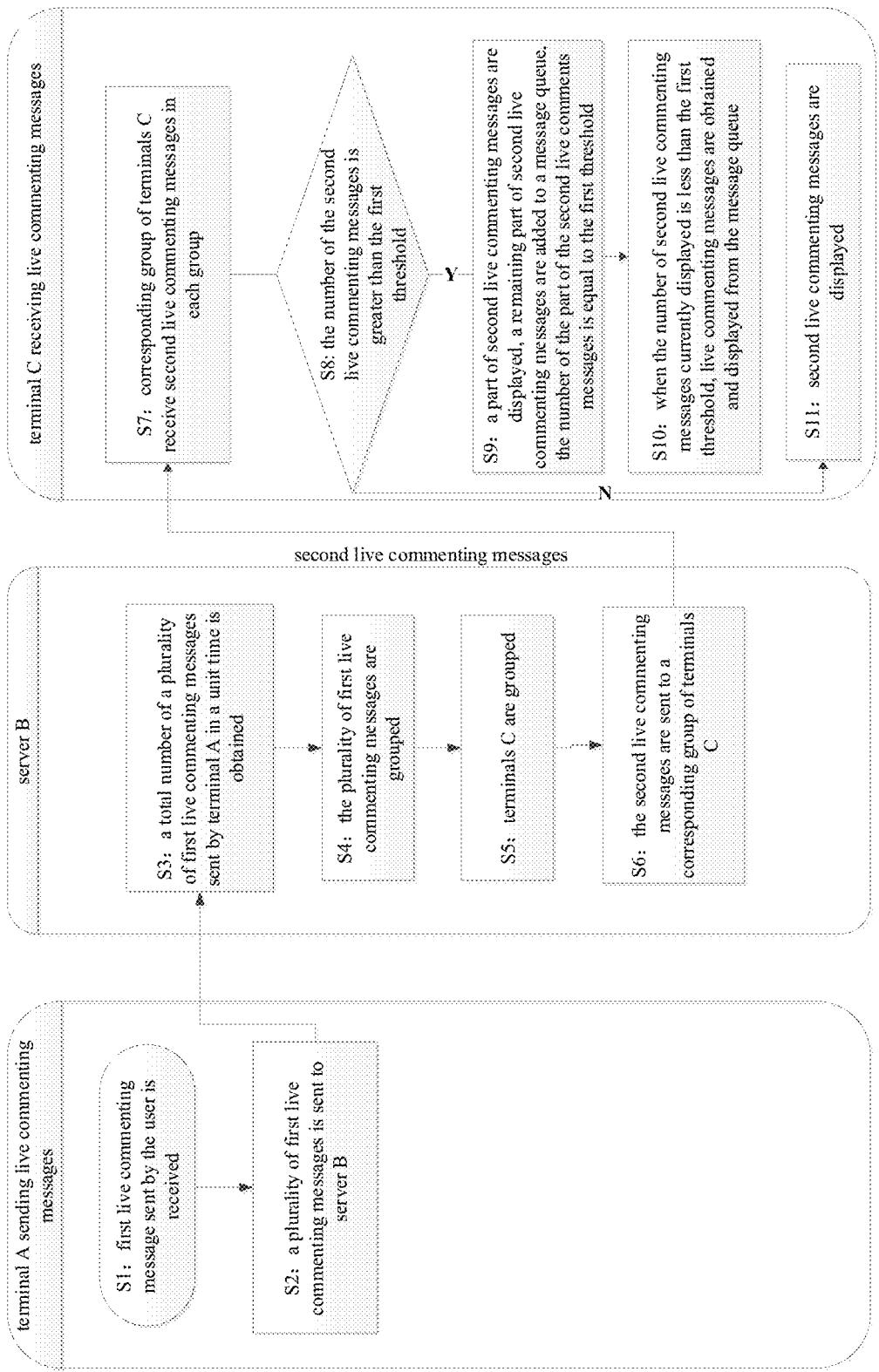
FIG. 12 is a schematic diagram of interaction between a server and terminals in an embodiment of a system for processing live commenting message according to an embodiment of the present disclosure.

In order to more clearly explain the system for processing live commenting messages according to embodiments of the present disclosure, the device 100 may interact with the device 200. With reference to FIG. 12, the device 100 is a server B, and the device 200 includes the terminals A sending the live commenting messages and terminals C receiving the live commenting messages, the interaction process between the device 100 and the device 200 may be illustrated as follows.

As shown in FIG. 12, in actual process, the terminal A receives the first live commenting message sent by the user (S1), and send a plurality of first live commenting messages to the server B (S2), the server B obtains the plurality of first live commenting messages sent by the terminal A in a unit time (S3), and calculates a ratio of the plurality of first live commenting messages to the first threshold based on the plurality of first live commenting messages sent by the terminal A and received in the unit time, to group the plurality of first live commenting messages based on the ratio (S4). The grouped plurality of first live commenting messages serve as the second live commenting messages.

Further, the server B groups the terminals C based on the ratio (S5), and sends the second live commenting messages in each group to the corresponding group of terminals C (S6) after the live commenting messages and the terminals are grouped.

The corresponding group of terminals C receive the second live commenting messages in each group (S7), before the second commenting messages are displayed, it is determined whether the total number of the second live commenting messages is greater than the first threshold (S8), when it is greater than the first threshold, it indicates that the current number of second live commenting messages is greater than the total number of live commenting messages displayable on the single screen of the terminal C, a part of the second live commenting messages are obtained and displayed from the second live commenting messages, and a remaining part of the second live commenting messages are added to a message queue, the number of the part of the second live comments messages is equal to the first threshold (S9), such that when the number of second live commenting messages currently displayed is less than the first threshold, the live commenting messages are obtained and displayed from the message queue (S10).

When the total number of the received second live commenting messages is less than or equal to the first threshold, it indicates that the current number of second live commenting messages is less than or equal to the total number of live commenting messages displayable on the single screen of the terminal C, the second live commenting messages are displayed directly (S11).

In summary, with the system for processing live commenting messages according to embodiments of the present disclosure, the server obtains the total number of a plurality of first live commenting messages received in the unit time, calculates the ratio of the total number of the plurality of first live commenting messages to the first threshold, groups the plurality of first live commenting messages based on the ratio, and groups the second terminals based on the ratio, and then sends each group of first live commenting messages to the corresponding group of terminals, the live commenting messages are displayed on the terminals. Thus, the live commenting messages displayed by the terminal can be enriched, and the interactivity between users can be improved.

Figure 13:
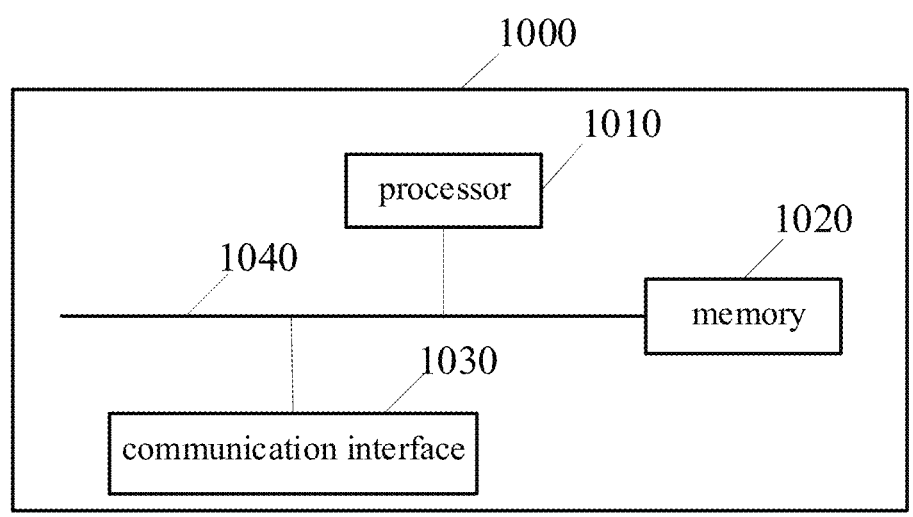
FIG. 13 is a schematic diagram of a server (terminal) according to an embodiment of the present disclosure.

In order to implement the above embodiments, the present disclosure further provides an electronic device. FIG. 13 is a schematic diagram of a server according to an embodiment of the present disclosure, as shown in FIG. 13, the server 1000 includes a processor 1010, a memory 1020, a communication interface 1030, and a bus 1040.

The processor 1010, the memory 1020 and the communication interface 1030 are connected via the bus 1040 and communicate with each other.

The memory 1020 is configured to store executable program codes.

The processor 1010 is configured to run a program corresponding to the executable program codes by reading the executable program codes stored in the memory, to perform a method for processing live commenting messages. The method includes: obtaining a total number of a plurality of first live commenting messages sent by a plurality of first terminals in a unit time; calculating a ratio of the total number of the plurality of first live commenting messages to a first threshold; grouping the plurality of first live commenting messages based on the ratio, in which the grouped plurality of first live commenting messages serve as second live commenting messages; grouping a plurality of second terminals based on the ratio, in which the plurality of second terminals are configured to receive the second live commenting messages; and sending the second live commenting messages to the second terminals sending the first live commenting messages. The second terminal displays the corresponding group of live commenting messages.

It should be noted that, the method for processing live commenting messages with reference to FIG. 1 and FIG. 2 corresponds to the server according to embodiments of the present disclosure, and the implementation principle is similar, and details are not described herein again.

In summary, with the server according to embodiments of the present disclosure, the total number of the plurality of first live commenting messages sent by the plurality of first terminals in the unit time is obtained, the ratio of the total number of the plurality of first live commenting messages to the first threshold is calculated, and the plurality of first live commenting messages are grouped based on the ratio, the grouped plurality of first live commenting messages serve as the second live commenting messages, and the second terminals are grouped based on the ratio, and then the second live commenting messages in each group are sent to the corresponding group of second terminals. Thus, the live commenting messages displayed by the terminal can be enriched, and the interactivity between users can be improved.

In order to implement the above embodiments, the present disclosure further provides a terminal. With reference to FIG. 13, the terminal also includes a processor 1010, a memory 1020, a communication interface 1030, and a bus 1040.

The processor 1010, the memory 1020 and the communication interface 1030 are connected via the bus 1040 and communicate with each other.

The memory 1020 is configured to store executable program codes.

The processor 1010 is configured to run a program corresponding to the executable program codes by reading the executable program codes stored in the memory, to perform a method for processing live commenting messages. The method includes: receiving a first live commenting message sent by a user; sending the first live commenting message to a server, in which the server is configured to count a total number of a plurality of first live commenting messages received in a unit time, calculate a ratio of the total number of the plurality of first live commenting messages to a first threshold, group the plurality of first live commenting messages and terminals based on the ratio, and send each group of first live commenting messages to a corresponding group of terminals, in which the terminals are configured to receive live commenting messages; receiving second live commenting messages sent by the server, in which the second live commenting messages are messages in a group corresponding to the grouped terminal; and displaying received second live commenting messages.

It should be noted that, the method for processing live commenting messages with reference to FIG. 3 to FIG. 5 corresponds to the terminal according to embodiments of the present disclosure, and the implementation principle is similar, and details are not described herein again.

In summary, with the terminal according to embodiments of the present disclosure, the first live commenting message sent by the user is received, the first live commenting message is sent to the server, the server counts the total number of the plurality of first live commenting messages received in the unit time, calculates the ratio of the total number of the plurality of first live commenting messages to the first threshold, groups the plurality of first live commenting messages and terminals based on the ratio, and sends each group of first live commenting messages to the corresponding group of terminals, the terminals are configured to receive live commenting messages, the second live commenting messages sent by the server are received, and the received second live commenting messages are displayed. Thus, the live commenting messages displayed by the terminal can be enriched, and the interactivity between users can be improved.

In order to implement the above embodiments, the present disclosure provides a storage medium. The storage medium is configured to store application programs that, when executed, a method for processing live commenting messages is performed. The method includes: obtaining a total number of a plurality of first live commenting messages sent by a plurality of first terminals in a unit time; calculating a ratio of the total number of the plurality of first live commenting messages to a first threshold; grouping the plurality of first live commenting messages based on the ratio, in which the grouped plurality of first live commenting messages serve as second live commenting messages; grouping a plurality of second terminals based on the ratio, in which the plurality of second terminals are configured to receive the second live commenting messages; and sending the second live commenting messages in each group to a corresponding group of second terminals. The second terminal displays the corresponding group of second live commenting messages.

In order to implement the above embodiments, the present disclosure provides a storage medium. The storage medium is configured to store application programs that, when executed, a method for processing live commenting messages is performed. The method includes: receiving a first live commenting message sent by a user; sending the first live commenting message to a server, in which the server is configured to count a total number of a plurality of first live commenting messages received in a unit time, calculate a ratio of the total number of the plurality of first live commenting messages to a first threshold, group the plurality of first live commenting messages and terminals based on the ratio, and send each group of first live commenting messages to a corresponding group of terminals, in which the terminals are configured to receive live commenting messages; receiving second live commenting messages sent by the server, in which the second live commenting messages are messages in a group corresponding to the grouped terminal; and displaying received second live commenting messages.

In order to implement the above embodiments, the present disclosure provides an application program. When the application program is executed, a method for processing live commenting messages is performed. The method includes: obtaining a total number of a plurality of first live commenting messages sent by a plurality of first terminals in a unit time; calculating a ratio of the total number of the plurality of first live commenting messages to a first threshold; grouping the plurality of first live commenting messages based on the ratio, in which the grouped plurality of first live commenting messages serve as second live commenting messages; grouping a plurality of second terminals based on the ratio, in which the plurality of second terminals are configured to receive the second live commenting messages; and sending the second live commenting messages in each group to a corresponding group of second terminals. The second terminal displays the corresponding group of second live commenting messages.

In order to implement the above embodiments, the present disclosure provides an application program. When the application program is executed, a method for processing live commenting messages is performed. The method includes: receiving a first live commenting message sent by a user; sending the first live commenting message to a server, in which the server is configured to count a total number of a plurality of first live commenting messages received in a unit time, calculate a ratio of the total number of the plurality of first live commenting messages to a first threshold, group the plurality of first live commenting messages and terminals based on the ratio, and send each group of first live commenting messages to a corresponding group of terminals, in which the terminals are configured to receive live commenting messages; receiving second live commenting messages sent by the server, in which the second live commenting messages are messages in a group corresponding to the grouped terminal; and displaying received second live commenting messages.

For the device embodiments, the electronic device embodiments, the storage medium embodiments and the application program embodiments, since they are basically similar to the method embodiments, the description is relatively simple, and the relevant parts can be referred to the description of the method embodiments.

It should be understood that, the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although explanatory embodiments have been shown and described, it would be appreciated that, the above embodiments cannot be construed to limit the present disclosure, and changes, modifications, alternatives and variations can be made by those skilled in the art within the scope of the present disclosure.

It should be noted that, in descriptions of the present disclosure, terms such as "first" and "second" are used herein for purposes of description and are not intended to indicate or imply relative importance or significance or to imply the number of indicated technical features. In addition, unless specified otherwise, "a plurality of" means two or more than two.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

It should be noted that, in order to simplify description the present disclosure, embodiments of the present disclosure are expressed as a series of action combinations, but it would be appreciated by those skilled in the art that the present disclosure is not limited to the order of the actions, because some steps may be executed in other orders or be executed at the same time. In addition, it would be further appreciated by those skilled in the art that embodiments described in the specification are preferred embodiments, actions and modules involved therein may not be necessary for the present disclosure.

In above embodiments, descriptions of respective embodiments are emphasized differently, and parts that are not detailed in some embodiments can refer to relevant descriptions of other embodiments.

In several embodiments provided by the present disclosure, it should be understood that, the system, devices and method disclosed in several embodiments provided by the present disclosure can be realized in any other manner. For example, the device embodiments described above can be merely exemplary, for example, the units are just divided according to logic functions. In practical implementation, the units may be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure In addition, respective functional units in respective embodiments of the present disclosure can be integrated into one processing unit, or can be present as separate physical entities. It is also possible that two or more than two units are integrated into one unit.

If the functions are realized in form of functional software units and are sold or used as separate products, they can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random-Access Memory (RAM), a disc, or a light disk.

The above embodiments are only used to illustrate the technical solutions of the present disclosure, and are not limited thereto. Although the present disclosure has been described in detail with reference to the foregoing embodiments, those skilled in the art should understand that, the technical solutions described in the foregoing embodiments may be modified or equivalently substituted for some of the technical features, and these modifications or substitutions do not detract from the scope of the technical solutions of the embodiments of the present disclosure.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure.

What is claimed is:

1. A method for processing live commenting messages, comprising:
    obtaining a total number of a plurality of first live commenting messages sent by a plurality of first terminals in a unit time;
    calculating a ratio of the total number of the plurality of first live commenting messages to a first threshold;
    grouping the plurality of first live commenting messages based on the ratio, wherein the grouped plurality of first live commenting messages serve as second live commenting messages;
    grouping a plurality of second terminals based on the ratio, wherein the plurality of second terminals are configured to receive the second live commenting messages; and
    sending the second live commenting messages in each group to a corresponding group of second terminals.

2. The method according to claim 1, wherein while sending the second live commenting messages in each group to the corresponding group of second terminals, the method further comprises:
    determining whether the second live commenting messages include the first live commenting message sent by the second terminal;
    when the second live commenting messages do not include the first live commenting messages sent by the second terminal, sending the first live commenting message sent by the second terminal to the second terminal while the second live commenting messages are sent to a corresponding group of second terminals;
    when the second live commenting messages include the first live commenting message sent by the second terminal, sending the second live commenting messages to the corresponding group of second terminals.

3. The method according to claim 1, wherein grouping the plurality of first live commenting messages based on the ratio comprises:
    obtaining identification information of each of the plurality of first live commenting messages;
    obtaining a modulo of the identification information of each of the plurality of first live commenting messages to the ratio, to obtain a modulo corresponding to each of the plurality of first live commenting messages; and
    dividing the first live commenting messages having a same modulo into a same group based on the modulo corresponding to each of the plurality of first live commenting messages.

4. The method according to claim 1, wherein grouping the plurality of the second terminals based on the ratio comprises:
    obtaining identification information of each of the plurality of second terminals;
    obtaining a modulo of the identification information of each of the plurality of second terminals to the ratio, to obtain a modulo corresponding to each of the plurality of second terminals; and
    dividing the second terminals having a same modulo into a same group based on the modulo corresponding to each of the plurality of second terminals.

5. The method according to claim 1, wherein the first threshold is a total number of live commenting messages displayable on a single screen of the second terminal.

6. A method for processing live commenting messages, comprising:
    receiving a first live commenting message sent by a user;
    sending the first live commenting message to a server, wherein the server is configured to count a total number of a plurality of first live commenting messages received in a unit time, calculate a ratio of the total number of the plurality of first live commenting messages to a first threshold, group the plurality of first live commenting messages and terminals based on the ratio, and send each group of first live commenting messages to a corresponding group of terminals, wherein the terminals are configured to receive live commenting messages;
    receiving second live commenting messages sent by the server, wherein the second live commenting messages are messages in a group corresponding to the grouped terminal; and
    displaying received second live commenting messages.

7. The method according to claim 6, wherein while displaying the received second live commenting messages, the method further comprises:
    displaying the first live commenting message sent by the user;

determining whether the second live commenting messages include the first live commenting message sent by the user;

when the second live commenting messages do not include the first live commenting messages sent by the user, displaying the received second live commenting messages and the first live commenting message sent by the user; and when the second live commenting messages include the first live commenting message sent by the user, performing deduplication on the second live commenting messages and the first live commenting message sent by the user, and displaying deduplicated second live commenting messages and the first live commenting message sent by the user.

8. The method according to claim 7, wherein displaying the received second live commenting message comprises:

detecting whether a total number of the received second live commenting messages is greater than the first threshold;

in response to detecting that the total number of the received second live commenting messages is less than or equal to the first threshold, displaying the received second live commenting messages;

in response to detecting that the total number of the received second live commenting messages is greater than the first threshold, obtaining and displaying a part of the second live commenting messages, and adding a remaining part of the second live commenting messages to a message queue, in which a number of the part of the second live comments messages is equal to the first threshold; and in response to detecting that the number of second live commenting messages currently displayed is less than the first threshold, obtaining and displaying the second live commenting messages from the message queue.

9. The method according to claim 7, wherein when the number of messages acceptable in the message queue is a second threshold, the method further comprises:

not adding newly received second live comment messages to the message queue when the number of second live comment messages in the message queue is greater than or equal to the second threshold; and continuing adding the newly received second live commenting messages to the message queue when the number of the second live commenting messages in the message queue is less than the second threshold.

10. The method according to claim 6, wherein displaying the received second live commenting message comprises:

detecting whether a total number of the received second live commenting messages is greater than the first threshold;

in response to detecting that the total number of the received second live commenting messages is less than or equal to the first threshold, displaying the received second live commenting messages;

in response to detecting that the total number of the received second live commenting messages is greater than the first threshold, obtaining and displaying a part of the second live commenting messages, and adding a remaining part of the second live commenting messages to a message queue, in which a number of the part of the second live comments messages is equal to the first threshold; and in response to detecting that the number of second live commenting messages currently displayed is less than the first threshold, obtaining and displaying the second live commenting messages from the message queue.

11. The method according to claim 6, wherein when the number of messages acceptable in the message queue is a second threshold, the method further comprises:

not adding newly received second live comment messages to the message queue when the number of second live comment messages in the message queue is greater than or equal to the second threshold; and continuing adding the newly received second live commenting messages to the message queue when the number of the second live commenting messages in the message queue is less than the second threshold.

12. The method according to claim 6, further comprising:

adjusting a speed for displaying live commenting messages based on the number of second live commenting messages in the message queue; and displaying the second live commenting messages to be displayed currently based on the adjusted speed.

13. The method according to claim 6, wherein, the first threshold is a total number of live commenting messages displayable on a single screen of the terminal, and the second threshold is N times the first threshold, where N is a natural number greater than or equal to 2.

14. A terminal, comprising:

a processor;

a memory, configured to store executable program codes;

wherein the processor is configured to run a program corresponding to the executable program codes by reading the executable program codes stored in the memory, to:

receive a first live commenting message sent by a user;

send the first live commenting message to a server, wherein the server is configured to count a total number of a plurality of first live commenting messages received in a unit time, calculate a ratio of the total number of the plurality of first live commenting messages to a first threshold, group the plurality of first live commenting messages and terminals based on the ratio, and send each group of first live commenting messages to a corresponding group of terminals, wherein the terminals are configured to receive live commenting messages;

receive second live commenting messages sent by the server, wherein the second live commenting messages are messages in a group corresponding to the grouped terminal; and display received second live commenting messages.

15. The terminal according to claim 14, wherein the processor is further configured to:

display the first live commenting message sent by the user;

determine whether the second live commenting messages include the first live commenting message sent by the user;

when the second live commenting messages do not include the first live commenting messages sent by the user, display the received second live commenting messages and the first live commenting message sent by the user; and when the second live commenting messages include the first live commenting message sent by the user, perform deduplication on the second live commenting messages and the first live commenting message sent by the user, and display deduplicated second live commenting messages and the first live commenting message sent by the user.

16. The terminal according to claim 15, wherein the processor is configured to display the received second live commenting message, to:
   detect whether a total number of the received second live commenting messages is greater than the first threshold;
   in response to detecting that the total number of the received second live commenting messages is less than or equal to the first threshold, display the received second live commenting messages;
   in response to detecting that the total number of the received second live commenting messages is greater than the first threshold, obtain and display a part of the second live commenting messages, and add a remaining part of the second live commenting messages to a message queue, in which a number of the part of the second live comments messages is equal to the first threshold; and
   in response to detecting that the number of second live commenting messages currently displayed is less than the first threshold, obtain and display the second live commenting messages from the message queue.

17. The terminal according to claim 14, wherein the processor is configured to display the received second live commenting message, to:
   detect whether a total number of the received second live commenting messages is greater than the first threshold;
   in response to detecting that the total number of the received second live commenting messages is less than or equal to the first threshold, display the received second live commenting messages;
   in response to detecting that the total number of the received second live commenting messages is greater than the first threshold, obtain and display a part of the second live commenting messages, and add a remaining part of the second live commenting messages to a message queue, in which a number of the part of the second live comments messages is equal to the first threshold; and
   in response to detecting that the number of second live commenting messages currently displayed is less than the first threshold, obtain and display the second live commenting messages from the message queue.

18. The terminal according to claim 14, wherein when the number of messages acceptable in the message queue is a second threshold, the processor is further configured to:
   not add newly received second live comment messages to the message queue when the number of second live comment messages in the message queue is greater than or equal to the second threshold; and
   continue adding the newly received second live commenting messages to the message queue when the number of the second live commenting messages in the message queue is less than the second threshold.

19. The terminal according to claim 14, wherein the processor is further configured to:
   adjust a speed for displaying live commenting messages based on the number of second live commenting messages in the message queue; and
   display the second live commenting messages to be displayed currently based on the adjusted speed.

20. The terminal according to claim 14, wherein,
   the first threshold is a total number of live commenting messages displayable on a single screen of the terminal, and
   the second threshold is N times the first threshold, where N is a natural number greater than or equal to 2.

* * * * *